(12) United States Patent
Gleason

(10) Patent No.: US 12,285,845 B2
(45) Date of Patent: Apr. 29, 2025

(54) PROTECTIVE LEACHING MASK ASSEMBLIES AND RELATED METHODS

(71) Applicant: US Synthetic Corporation, Orem, UT (US)

(72) Inventor: Michael James Gleason, Orem, UT (US)

(73) Assignee: US Synthetic Corporation, Orem, UT (US)

(*) Notice: Subject to any disclaimer, the term of this patent is extended or adjusted under 35 U.S.C. 154(b) by 334 days.

(21) Appl. No.: 18/073,141

(22) Filed: Dec. 1, 2022

(65) Prior Publication Data

US 2023/0089898 A1    Mar. 23, 2023

Related U.S. Application Data

(60) Division of application No. 16/513,005, filed on Jul. 16, 2019, now Pat. No. 11,541,509, which is a
(Continued)

(51) Int. Cl.
    *C23F 4/00*    (2006.01)
    *B24D 3/00*    (2006.01)
    (Continued)

(52) U.S. Cl.
    CPC ............. *B24D 18/009* (2013.01); *B24D 3/00* (2013.01); *B24D 18/0009* (2013.01);
    (Continued)

(58) Field of Classification Search
    CPC .... B24D 18/009; B24D 3/00; B24D 18/0009; B24D 99/005; C23F 1/02; C23F 4/00;
    (Continued)

(56) References Cited

U.S. PATENT DOCUMENTS 4,268,276 A    5/1981    Bovenkerk
4,410,054 A    10/1983   Nagel
(Continued)

OTHER PUBLICATIONS

Nee, John G., (2010) Fundamentals of Tool Design (6th Edition)-5.5.2.1 Interference Fits. Society of Manufacturing Engineers (SME). Http://app.knovel.com/hotlink/pdf/id.kt00A4NTB1/fundamentals-tools-design/interference-fits.

*Primary Examiner* — Alexandra M Moore
(74) *Attorney, Agent, or Firm* — BKRIP LLC

(57) ABSTRACT

Embodiments of the invention relate generally to protective leaching masks, and methods of manufacturing and using the same for leaching superabrasive elements such as polycrystalline diamond elements. In an embodiment, a protective leaching mask assembly includes a superabrasive element including a central axis and a superabrasive table, and a protective mask formed to protect at least a portion of the superabrasive element. The protective mask includes a base portion and at least one sidewall extending from the base portion and defining an opening generally opposite the base portion. The at least one sidewall includes an inner surface configured to abut with a selected portion of the superabrasive element being chemically resistant to a leaching agent and an outer surface sloping at an oblique angle relative to the central axis.

22 Claims, 18 Drawing Sheets

Related U.S. Application Data continuation of application No. 14/956,089, filed on Dec. 1, 2015, now Pat. No. 10,391,613, which is a continuation of application No. 13/751,405, filed on Jan. 28, 2013, now Pat. No. 9,227,302.

(51) Int. Cl.

| | | |
|---|---|---|
| *B24D 18/00* | (2006.01) | |
| *B24D 99/00* | (2010.01) | |
| *C23F 1/02* | (2006.01) | |
| *E21B 10/567* | (2006.01) | |
| *F16C 33/04* | (2006.01) | |
| *F16C 33/26* | (2006.01) | |
| *E21B 10/46* | (2006.01) | |
| *F16C 17/02* | (2006.01) | |
| *F16C 17/04* | (2006.01) | |

(52) U.S. Cl.
CPC .............. *B24D 99/005* (2013.01); *C23F 1/02* (2013.01); *E21B 10/567* (2013.01); *F16C 33/043* (2013.01); *F16C 33/26* (2013.01); *B05D 2203/00* (2013.01); *B05D 2506/15* (2013.01); *C23F 4/00* (2013.01); *E21B 10/46* (2013.01); *F16C 17/02* (2013.01); *F16C 17/04* (2013.01)

(58) Field of Classification Search
CPC .......... C23F 1/28; E21B 10/567; E21B 10/46; F16C 33/043; F16C 33/26; F16C 17/02; F16C 17/04; B05D 2203/00; B05D 2506/15

See application file for complete search history.

(56) References Cited

U.S. PATENT DOCUMENTS

| | | |
|---|---|---|
| 4,468,138 A | 8/1984 | Nagel |
| 4,560,014 A | 12/1985 | Geczy |
| 4,566,800 A * | 1/1986 | Bodine .................... C22B 3/04 366/128 |
| 4,738,322 A | 4/1988 | Hall |
| 4,811,801 A | 3/1989 | Salesky |
| 4,913,247 A | 4/1990 | Jones |
| 5,016,718 A | 5/1991 | Tandberg |
| 5,092,687 A | 3/1992 | Hall |
| 5,120,327 A | 6/1992 | Dennis |
| 5,135,061 A | 8/1992 | Newton, Jr. |
| 5,154,245 A | 10/1992 | Waldenstrom |
| 5,364,192 A | 11/1994 | Damm |
| 5,368,398 A | 11/1994 | Damm |
| 5,460,233 A | 10/1995 | Meany |
| 5,480,233 A | 1/1996 | Cunningham |
| 5,544,713 A | 8/1996 | Dennis |
| 5,881,830 A | 3/1999 | Cooley |
| 6,793,681 B1 | 9/2004 | Pope |
| 8,932,377 B2 | 1/2015 | Belnap |
| 9,227,302 B1 | 1/2016 | Gleason |
| 2007/0169419 A1* | 7/2007 | Davis .................... B01J 19/008 51/293 |
| 2008/0236900 A1 | 10/2008 | Cooley |
| 2010/0001673 A1 | 1/2010 | Cardoletti |
| 2010/0011673 A1 | 1/2010 | Shamburger |
| 2010/0012390 A1 | 1/2010 | Shamburger |
| 2011/0056141 A1 | 3/2011 | Miess |
| 2012/0048468 A1 | 3/2012 | Turner |
| 2012/0152065 A1 | 6/2012 | Ladi |
| 2012/0247841 A1 | 10/2012 | Tessitore |

* cited by examiner

PROTECTIVE LEACHING MASK ASSEMBLIES AND RELATED METHODS

CROSS-REFERENCE TO RELATED APPLICATIONS

This application is a divisional of U.S. application Ser. No. 16/513,005 filed on 16 Jul. 2019, which application is a continuation of U.S. application Ser. No. 14/956,089 filed on 1 Dec. 2015, which is a continuation of U.S. application Ser. No. 13/751,405 filed on 28 Jan. 2013, the disclosure of each of which is incorporated herein, in its entirety, by this reference.

BACKGROUND

Wear-resistant, superabrasive materials are traditionally utilized for a variety of mechanical applications. For example, polycrystalline diamond ("PCD") materials are often used in drilling tools (e.g., cutting elements, gage trimmers, etc.), machining equipment, bearing apparatuses, wire-drawing machinery, and in other mechanical systems.

Conventional superabrasive materials have found utility as superabrasive cutting elements in rotary drill bits, such as roller cone drill bits and fixed-cutter drill bits. A conventional cutting element may include a superabrasive layer or table, such as a PCD table. The cutting element may be brazed, press-fit, or otherwise secured into a preformed pocket, socket, or other receiving space formed in the rotary drill bit. In another configuration, the substrate may be brazed or otherwise joined to an attachment member such as a stud or a cylindrical backing. Generally, a rotary drill bit may include one or more PCD cutting elements affixed to a bit body of the rotary drill bit.

As mentioned above, conventional superabrasive materials have found utility as bearing elements in thrust-bearing and radial bearing apparatuses. A conventional bearing element typically includes a superabrasive layer or table, such as a PCD table, bonded to a substrate. One or more bearing elements may be mounted to a bearing rotor or stator by press-fitting, brazing, mechanically coupled, or through other suitable methods of attachment. Typically, bearing elements mounted to a bearing rotor have superabrasive faces configured to contact corresponding superabrasive faces of bearing elements mounted to an adjacent bearing stator.

Cutting elements having a PCD table may be formed and bonded to a substrate using an ultra-high pressure, ultra-high temperature ("HPHT") sintering process. Often, cutting elements having a PCD table are fabricated by placing a cemented carbide substrate, such as a cobalt-cemented tungsten carbide substrate, into a container or cartridge with a volume of diamond particles positioned on a surface of the cemented carbide substrate. A number of such cartridges may be loaded into an HPHT press. The substrates and diamond particle volumes may then be processed under HPHT conditions in the presence of a catalyst material that causes the diamond particles to bond to one another to form a diamond table having a matrix of bonded diamond crystals. The catalyst material is often a metal-solvent catalyst, such as cobalt, nickel, or iron, which facilitates intergrowth and bonding of the diamond crystals.

In one conventional approach, a constituent of the cemented-carbide substrate, such as cobalt from a cobalt-cemented tungsten carbide substrate, liquefies and sweeps from a region adjacent to the volume of diamond particles into interstitial regions between the diamond particles during the HPHT process. The cobalt may act as a catalyst to facilitate the formation of bonded diamond crystals. A metal-solvent catalyst may also be mixed with a volume of diamond particles prior to subjecting the diamond particles and substrate to the HPHT process.

The presence of the metal-solvent catalyst and/or other materials in the diamond table may reduce the thermal stability of the diamond table at elevated temperatures. For example, the difference in thermal expansion coefficient between the diamond grains and the metal-solvent catalyst is believed to lead to chipping or cracking in the PCD table of a cutting element during drilling or cutting operations. The chipping or cracking in the PCD table may degrade the mechanical properties of the cutting element or lead to failure of the cutting element. Additionally, at high temperatures, diamond grains may undergo a chemical breakdown or back-conversion with the metal-solvent catalyst. Further, portions of diamond grains may transform to carbon monoxide, carbon dioxide, graphite, or combinations thereof, thereby degrading the mechanical properties of the PCD material.

Accordingly, it is desirable to remove metal-solvent catalyst from a PCD material in situations when the PCD material may be exposed to high temperatures. Chemical leaching is often used to dissolve and remove various materials from the PCD layer. For example, chemical leaching may be used to remove metal-solvent catalysts, such as cobalt, from regions of a PCD layer that may experience elevated temperatures during drilling, such as regions adjacent to the working surfaces of the PCD layer.

Conventional chemical leaching techniques often involve the use of highly concentrated and corrosive solutions, such as highly acidic solutions, to dissolve and remove metal-solvent catalysts from polycrystalline diamond materials. However, in addition to dissolving metal-solvent catalysts from a PCD material, leaching solutions may also dissolve any accessible portions of a substrate to which the PCD material is attached. For example, highly acidic leaching solutions may dissolve any accessible portions of a cobalt-cemented tungsten carbide substrate, causing undesired pitting and/or other corrosion of the substrate surface.

In some conventional leaching techniques, a polymeric leaching cup may be placed around a portion of a PCD element to protect the substrate from a leaching solution. A polymeric leaching cup may, for example, surround the substrate surface and a portion of the PCD layer near the substrate. Such leaching cups may not, however, provide adequate protection under various leaching conditions. It may be desirable to expose PCD articles to leaching solutions for varying periods of time and/or to expose the PCD articles to leaching solutions under various temperature and/or pressure conditions to obtain specified leach depths. While various temperatures, pressures, and leach times may enable leaching of a PCD article to a desired degree, such conditions may undesirably cause portions of the substrate of the PCD article to be exposed to a leaching solution. For example, a leaching solution may pass between portions of the cup and the PCD article, resulting in portions of the substrate or other protected part of the PCD article being exposed to the leaching solution. Additionally, gases, such as air, may be trapped between a leaching cup and a PCD article when the cup is placed around the PCD article. During leaching, trapped gases may expand due to an increase in temperature and/or a decrease in pressure, pushing the PCD article out of the leaching cup and exposing a portion of the substrate or other protected part of the PCD article to the leaching solution. Such exposure to leaching solutions may result in undesired corrosion and/or damage to PCD substrates.

U.S. patent application Ser. No. 12/555,715 discloses other examples of processing superabrasive elements that include the use of protective layers formed on portions of the superabrasive elements. The disclosure of U.S. patent application Ser. No. 12/555,715 is incorporated herein, in its entirety, by this reference.

SUMMARY

Embodiments of the invention relate generally to protective leaching mask assemblies and methods of using such protective leaching mask assemblies to at least partially leach a superabrasive element. In an embodiment, a protective leaching mask assembly may include a superabrasive element including a central axis and a superabrasive table. The assembly may further include a protective mask overmolded onto at least a portion of the superabrasive element. The protective mask may include a base portion and at least one sidewall extending from the base portion and defining an opening generally opposite the base portion. The at least one sidewall may include an inner surface that abuts with a selected portion of the superabrasive element being chemically resistant to a leaching agent. The at least one sidewall may further include an outer surface sloping at an oblique angle relative to the central axis of the superabrasive element.

In an embodiment, a protective leaching mask assembly may include a superabrasive element including a central axis and a superabrasive table. The assembly may further include a protective mask overmolded onto at least a portion of the superabrasive element. The protective mask may be chemically resistant to a leaching agent and may include a base portion and at least one sidewall extending from the base portion and defining an opening generally opposite the base portion. The at least one sidewall may include an inner surface abutting a selected portion of the superabrasive element and an outer surface sloping at an oblique angle relative to the central axis of the superabrasive element. The assembly may further include a binding member interference fitted with the outer surface of the at least one sidewall. The binding member may compress the inner surface against the selected portion of the superabrasive element.

In an embodiment, a method of processing a superabrasive element includes overmolding a protective mask onto a selected portion of a superabrasive element having a superabrasive table. The method may further include exposing at least a portion of the superabrasive element to a leaching agent such that the leaching agent contacts an exposed surface region of the superabrasive table and at least a portion of the protective mask. In an embodiment, the method further includes interference fitting a binding member with an outer side surface of the overmolded protective mask near the superabrasive table.

Features from any of the disclosed embodiments may be used in combination with one another, without limitation. In addition, other features and advantages of the present disclosure will become apparent to those of ordinary skill in the art through consideration of the following detailed description and the accompanying drawings.

BRIEF DESCRIPTION OF THE DRAWINGS

The drawings illustrate several embodiments, wherein identical reference numerals refer to identical or similar elements or features in different views or embodiments shown in the drawings.

DETAILED DESCRIPTION

Embodiments of the invention relate generally to overmolded protective leaching masks, and methods of manufacturing and using the same for leaching superabrasive elements such as polycrystalline diamond elements. Such polycrystalline diamond elements may be used as cutting elements for use in a variety of applications, such as drilling tools, machining equipment, cutting tools, and other apparatuses, without limitation. Polycrystalline diamond elements, as disclosed herein, may also be used as bearing elements in a variety bearing applications, such as thrust bearings, radial bearing, and other bearing apparatuses, without limitation.

The terms "superabrasive" and "superhard," as used herein, may refer to any material having a hardness that is at least equal to a hardness of tungsten carbide. For example, a superabrasive article may represent an article of manufacture, at least a portion of which may exhibit a hardness that is equal to or greater than the hardness of tungsten carbide. The term "cutting," as used herein, may refer to machining processes, drilling processes, boring processes, combinations thereof, or any other material removal process utilizing a cutting element and/or other cutting apparatus, without limitation.

Figure 1A:
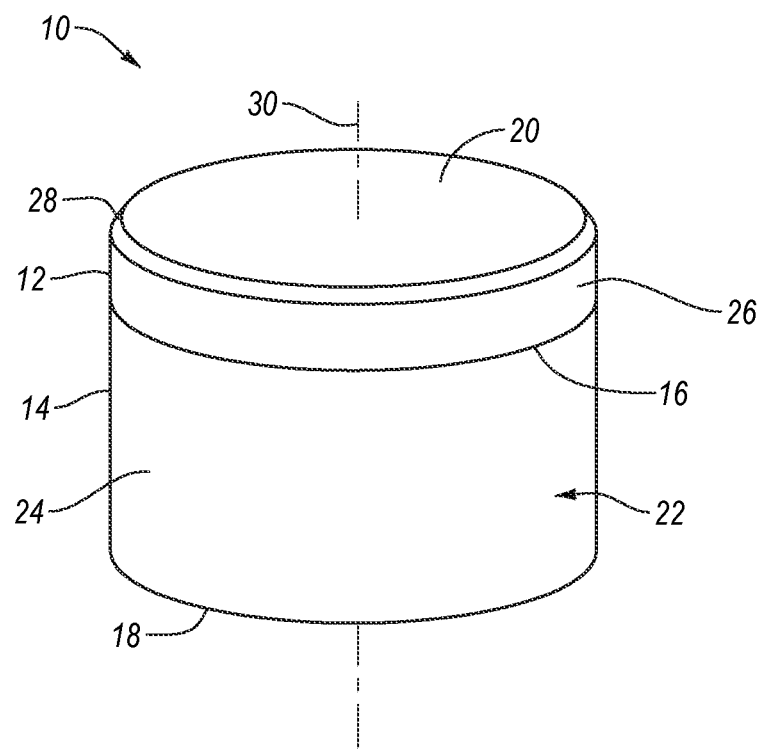
FIG. 1A is an isometric view of a superabrasive element according to an embodiment.
Figure 1B:
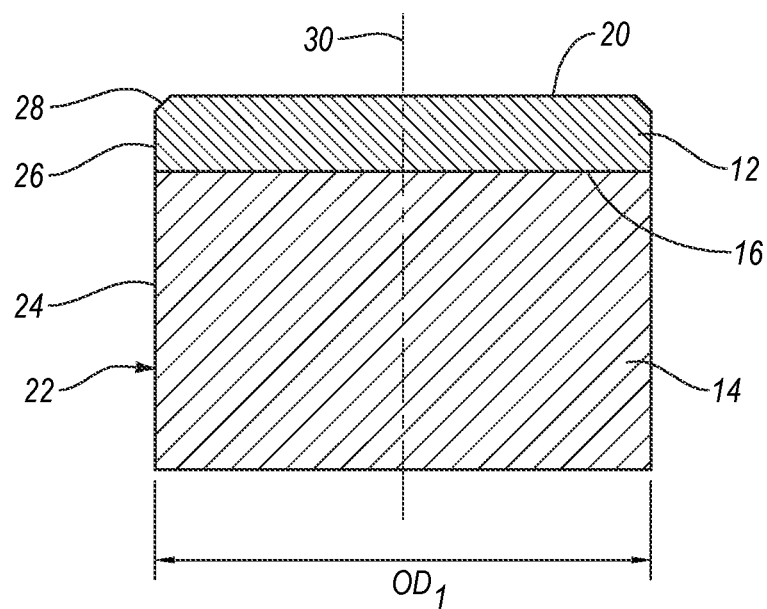
FIG. 1B is a cross-sectional view of the superabrasive element illustrated in FIG. 1A.

FIGS. 1A and 1B illustrate a superabrasive element 10 according to an embodiment. As illustrated in FIGS. 1A and 1B, superabrasive element 10 may include a superabrasive table 12 affixed to or formed upon a substrate 14. Superabrasive table 12 may be affixed to substrate 14 at interface 16. Superabrasive element 10 may include a rear face 18, a superabrasive face 20, and an element side surface 22. In an embodiment, element side surface 22 may include a substrate side surface 24 formed by substrate 14 and a superabrasive side surface 26 formed by superabrasive table 12. Rear face 18 may be formed by substrate 14. Superabrasive element 10 may also include a superabrasive face 20. Optionally, superabrasive element 10 may include a chamfer 28 formed by superabrasive table 12. Chamfer 28 may include an angular and/or rounded edge formed at the intersection of superabrasive side surface 26 and superabrasive face 20. In various embodiments, chamfer 28 may include a chamfered surface and/or other selected geometry (e.g., one or more radius and/or one or more chamfer, etc.) extending between superabrasive side surface 26 and superabrasive face 20. At least one edge may be formed at the intersection of chamfer 28 and superabrasive face 20 and/or at the intersection of chamfer 28 and superabrasive side surface 26.

Superabrasive element 10 may include any suitable size, shape, geometry, or combinations thereof, without limitation. For example, superabrasive element 10 may exhibit a symmetrical shape or a non-symmetrical shape. In an embodiment, at least a portion of superabrasive element 10 may have a substantially cylindrical shape centered about a central axis 30. For example, superabrasive element 10 may include a substantially cylindrical outer surface extending about the central axis 30 that extends through superabrasive element 10, as illustrated in FIGS. 1A and 1B. In an embodiment, one or more portions of element side surface 22 may define at least part of a substantially cylindrical surface and may have any suitable diameter relative to central axis 28, without limitation. In an embodiment, substrate side surface 24 and superabrasive side surface 26 may have substantially the same outer diameter $OD_1$ relative to central axis 30, as shown in FIG. 1B. In other embodiments, element side substrate side surface 24 and superabrasive side surface 26 may each have a different outer diameter relative to central axis 30.

Substrate 14 may include any suitable material on which superabrasive table 12 may be formed. For example, substrate 14 may include a cemented carbide material, such as a cobalt-cemented tungsten carbide material and/or any other suitable material. Substrate 14 may include a suitable metal-solvent catalyst material, such as cobalt, nickel, iron, or alloys thereof. Substrate 14 may also include any other suitable material including, without limitation, cemented carbides such as titanium carbide, niobium carbide, tantalum carbide, vanadium carbide, chromium carbide, and/or combinations of any of the preceding carbides cemented with iron, nickel, cobalt, or alloys thereof. Superabrasive table 12 may be formed of any suitable superabrasive and/or superhard material or combination of materials, including, for example, PCD. In other embodiments, superabrasive table 12 may include cubic boron nitride, silicon carbide, diamond, mixtures thereof, or composites including one or more of the foregoing materials, without limitation.

Superabrasive table 12 may be formed using any suitable technique. For example, superabrasive table 12 may include a PCD layer formed by subjecting a plurality of diamond particles (e.g., diamond particles having an average particle size between approximately 0.5 μm and approximately 150 μm) to an HPHT sintering process in the presence of a metal-solvent catalyst, such as cobalt, nickel, iron, combinations thereof, alloys thereof, or any other suitable group VIII element or alloys thereof. During an HPHT sintering process, adjacent diamond crystals in a mass of diamond particles may become bonded to one another, forming a PCD table comprising directly bonded diamond crystals exhibiting diamond-to-diamond bonding therebetween (e.g., $sp^3$ bonding). In an embodiment, bonded diamond crystals in superabrasive table 12 may have an average grain size of approximately 20 μm or less. Further, during an HPHT sintering process, diamond grains may become bonded to adjacent to substrate 14 at interface 16.

According to various embodiments, superabrasive table 12 may be formed by placing diamond particles adjacent to substrate 14 including cobalt-cemented tungsten carbide. In some embodiments, material components of substrate 14 may migrate into the interstitial regions in the mass of diamond particles used to form superabrasive table 12 during HPHT sintering. The resulting sintered PCD material forming superabrasive table 12 may include a matrix of bonded diamond grains and interstitial regions defined between the bonded diamond grains. Such interstitial regions may be at least partially filled with various materials, including, for example, cobalt, tungsten, tungsten carbide, or combinations of the foregoing.

According to an embodiment, as the mass of diamond particles is sintered, a metal-solvent catalyst may melt and flow from substrate 14 into the mass of diamond particles. As the metal-solvent flows into superabrasive table 12, it may also dissolve and/or carry additional materials, such as tungsten and/or tungsten carbide, from substrate 14 into the mass of diamond particles. As the metal-solvent catalyst flows into the mass of diamond particles, the metal-solvent catalyst, and any dissolved and/or undissolved materials may at least partially fill spaces between the diamond particles. The metal-solvent catalyst may facilitate bonding of adjacent diamond particles to form a PCD layer. Additionally, as the PCD layer is cooled, the metal-solvent catalyst may solidify and adhere to diamond grains in the PCD layer, holding at least a portion of the PCD layer in a compressed state.

Following sintering, various materials, such as a metal-solvent catalyst, remaining in interstitial regions within superabrasive table 12 may reduce the thermal stability of superabrasive table 12 at elevated temperatures. It is currently believed that differences in thermal expansion coefficients between diamond grains in superabrasive table 12 and a metal-solvent catalyst in interstitial regions between the diamond grains may damage portions of superabrasive table 12 that are exposed to elevated temperatures, such as temperatures developed during drilling and/or cutting operations. Such portions of superabrasive table 12 may be excessively worn and/or damaged during the drilling and/or cutting operations.

Removing the metal-solvent catalyst and/or other materials from superabrasive table 12 may improve its wear resistance, heat resistance, thermal stability, or combinations thereof, particularly in situations where the PCD material may be exposed to elevated temperatures. A metal-solvent catalyst and/or other materials may be removed from superabrasive table 12 using any suitable technique, including, for example, leaching. In an embodiment, a metal-solvent catalyst, such as cobalt, may be removed from regions of superabrasive table 12, such as regions generally adjacent to the working surfaces of superabrasive table 12. Removing a metal-solvent catalyst from superabrasive table 12 may reduce damage to the PCD material caused by expansion of the metal-solvent catalyst.

At least a portion of a metal-solvent catalyst, such as cobalt, as well as other materials, may be removed from at least a portion of superabrasive table 12 using any suitable technique, without limitation. For example, chemical, liquid, gaseous leaching, or combinations thereof may be used to remove a metal-solvent catalyst from superabrasive table 12 up to a desired depth from a surface of superabrasive table 12. For example, the metal-solvent catalyst may be at least partially leached from superabrasive table 12 to a selected depth "d" as measured from at least one of superabrasive face 20, superabrasive side surface 26, or chamfer 28 to form a leached region that is at least partially depleted of the metal-solvent catalyst. For example, the leached region may generally contour superabrasive face 20, superabrasive side surface 26, and chamfer 28. The leached region may also extend along a selected length of superabrasive side surface 26. Generally, the selected depth "d" may be less than about 100 µm, greater than 250 µm, about 200 µm to about 600 µm, greater than 300 µm to about 425 µm, greater than 350 µm to about 400 µm, greater than 350 µm to about 375 µm, about 375 µm to about 400 µm, about 500 µm to about 650 µm, about 400 µm to about 600 µm, about 600 µm to about 800 µm, or about 10 µm to about 500 µm.

Any suitable leaching agent, such as a leaching solution and/or a gas mixture, may be used to leach materials from superabrasive table 12, without limitation. For example, a corrosive leaching solution may be used to remove a metal-solvent catalyst from the interstitial spaces between diamond grains in superabrasive table 12. In some embodiments, the leaching solution may include various acids or bases, and/or other suitable reagents, including, without limitation, peroxide, nitric acid, hydrofluoric acid, hydrochloric acid, mixtures thereof, or combinations thereof. Superabrasive element 10 may be exposed to the leaching solution for any suitable period of time. In some embodiments, only selected portions of superabrasive table 12 may be leached, leaving remaining portions unleached. For example, some portions of one or more surfaces of superabrasive table 12 may be masked or otherwise protected from exposure to a leaching solution and/or gas mixture, for example, by a protective mask 232 (shown in FIG. 2A), while other portions of one or more surfaces of superabrasive table 12 may be exposed to the leaching solution and/or gas mixture. Other suitable techniques may be used for removing a metal-solvent catalyst and/or other materials from superabrasive table 12 or may be used to accelerate a chemical leaching process. For example, exposing the superabrasive material to heat, pressure, electric current, microwave radiation, and/or ultrasound may be employed to leach or to accelerate a chemical leaching process, without limitation. Following leaching, superabrasive table 12 may include a volume of superabrasive table 12 that is substantially free of a metal-solvent catalyst.

Figure 2A:
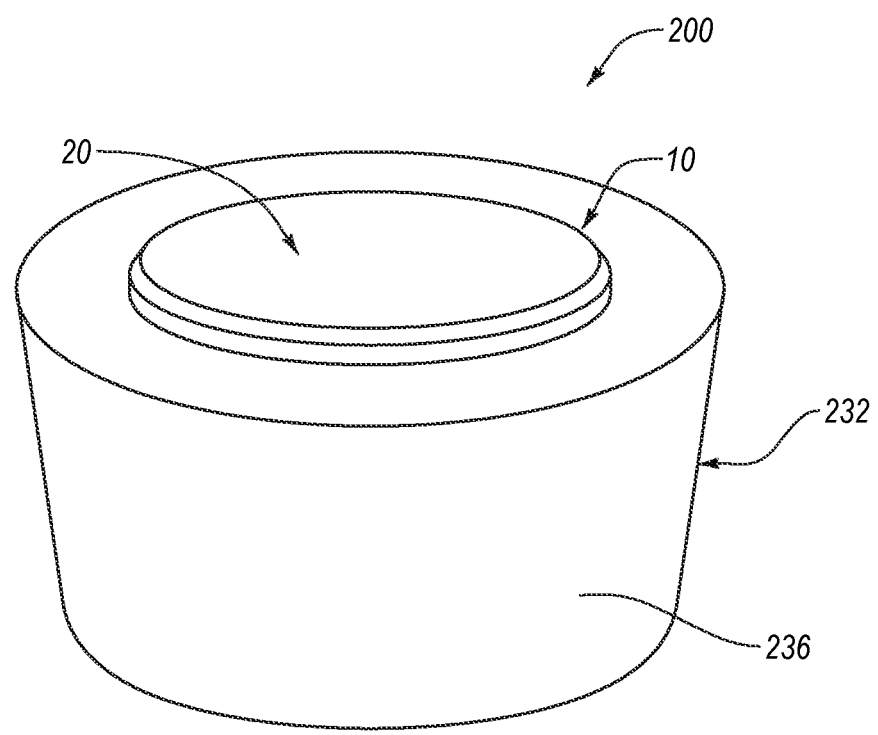
FIG. 2A is an isometric view of an overmolded protective leaching mask assembly according to an embodiment.
Figure 2B:
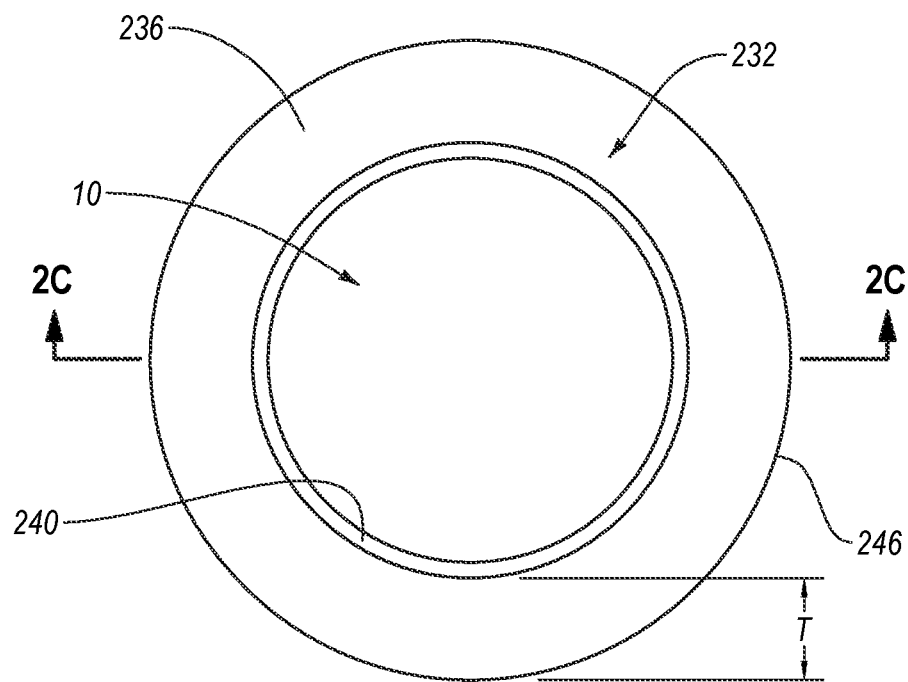
FIG. 2B is a top view of the overmolded protective leaching mask assembly shown in FIG. 2A.
Figure 2C:
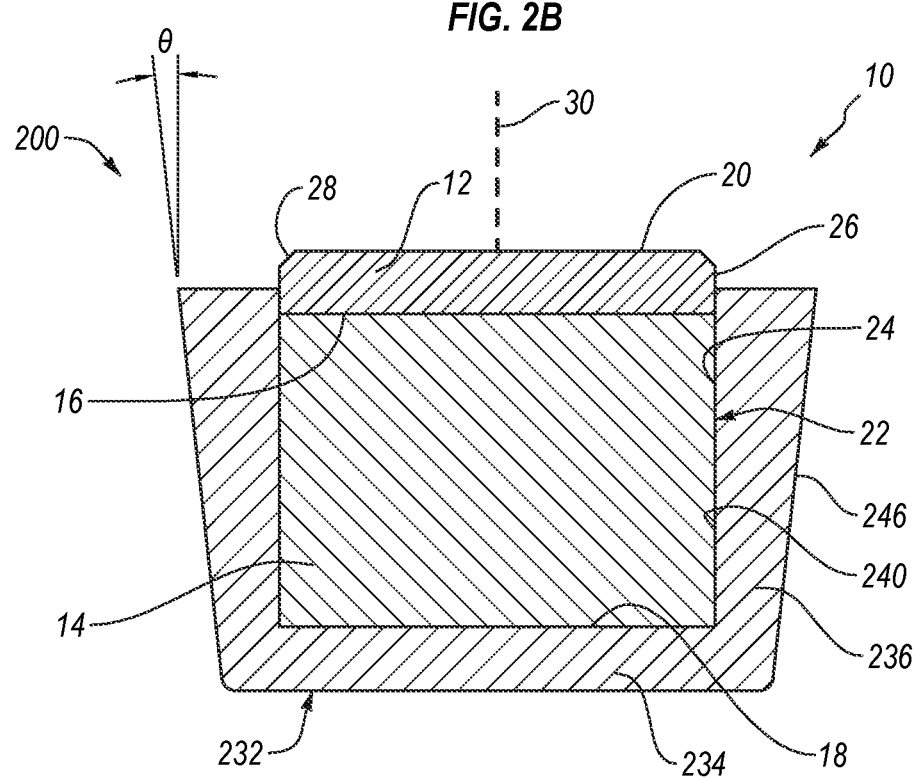
FIG. 2C is a cross-sectional view of the overmolded protective leaching mask assembly shown in FIG. 2B taken along section line 2C-2C.

FIGS. 2A through 2C illustrate a protective leaching mask assembly 200 according to an embodiment for selectively exposing the superabrasive element 10 to a leaching solution. The protective leaching mask assembly 200 may include superabrasive element 10 and an overmolded protective mask 232 at least partially surrounding superabrasive element 10. Protective mask 232 may help prevent leaching to superabrasive element 10 when superabrasive element 10 is exposed to various leaching agents. For example, protective mask may help prevent a leaching solution from chemically leaching certain portions of superabrasive element 10, such as portions of substrate 14, portions of superabrasive table 12, or both.

In some embodiments, portions of superabrasive element 10 that are affixed and/or adjacent to protective mask 232 may be protected from leaching, corrosion, and/or other damage under different leaching conditions, including, for example, temperatures ranging between about twenty-five (25) degrees Celsius and about four-hundred (400) degrees Celsius and pressures ranging between about one (1) bar and about two-hundred (200) bar. In an embodiment, protective mask 232 may also enable leaching of superabrasive element 10 at temperatures below about twenty-five (25) degrees Celsius or above about four-hundred (400) degrees and/or at pressures below one (1) bar and/or above about one-hundred (100) bar.

Protective mask 232 may include any suitable material. Protective mask 232 may include one or more materials that is configured to be directly and/or indirectly overmolded on at least a portion of superabrasive element 10. For example, at least a portion of protective mask 232 may be affixed and/or bonded to surface portions of substrate 14 and/or superabrasive table 14 such that a leaching solution is prevented or inhibited from passing between protective mask 232 and superabrasive element 10. In an embodiment, to help bond protective mask 232 to superabrasive element 10, protective mask 232 may include one or more materials capable of bonding or affixing to superabrasive element 10 under various conditions. In an embodiment, protective mask 232 may include one or more materials capable of substantially maintaining its shape and/or configuration during leaching of superabrasive element 10. In addition, protective mask 232 may include relatively stiffer materials than conventional protective cups because the superabrasive element 10 need not be loaded into protective mask 232 like conventional leaching cups. Protective mask 232 may include one or more materials substantially resistant to various chemicals present in a leaching solution. For example, protective mask 232 may include one or more materials that are substantially inert and/or otherwise resistant to acids, bases, and/or other reactive compounds present in a leaching solution used to leach superabrasive element 10.

Protective mask 232 may also include one or more materials substantially resistant to expansion and/or shrinkage under conditions present during leaching. For example, protective mask 232 may include one or more materials exhibiting stability at various temperatures and/or pressures, including elevated temperatures and/or pressures used in leaching and/or otherwise processing superabrasive element 10.

In an embodiment, protective mask 232 may include one or more polymeric materials. For example, protective mask 232 may include one or more thermoplastic polymer materials, including, without limitation, a fluoropolymer, polypropylene, polyvinylidene fluoride, polyvinyl chloride, polytetrafluoroethylene, polyvinylidene difluoride, or combinations of the foregoing. In some embodiments, protective mask 232 may include a material configured to contract against a selected portion of superabrasive element 10. As disclosed in co-pending application Ser. No. 12/555,715, protective mask 232 may include a thermosetting and/or thermoplastic material that may be formed over superabrasive element 10 through the application of heat and/or pressure.

In an embodiment, protective mask 232 may include multiple layers of materials. In an embodiment, the multiple layers of materials may include one or more materials. For example, various layers of material in protective mask 232 may include different materials. In an embodiment, the multiple layers of protective mask 232 may be formed at different times. For example, a first layer may be overmolded directly on at least a portion of substrate 14 and/or superabrasive table 12. Subsequently, a second layer may be overmolded on the first layer. In an embodiment, the first layer and second layer may be formed of substantially the same materials. In other embodiments, the first layer and the second layer may be formed of different materials. In yet other embodiments, additional layers formed of relatively the same and/or different materials as the first layer and the second layer may also be formed.

Protective mask 232 may be selectively overmolded on portions of substrate 14 and/or superabrasive table 12 in any suitable pattern, design, or as otherwise desired without limitation. According to some embodiments, protective mask 232 may be formed over a selected portion of superabrasive element 10 such that a surface region (e.g. superabrasive face 20) of superabrasive element 10 is exposed. For example, protective mask 232 may be overmolded on a selected portion of superabrasive element 10 that includes at least a portion of substrate 14 and/or superabrasive table 12.

As illustrated in FIG. 2C, protective mask 232 may be formed over a selected portion of superabrasive element 10 that includes rear face 18 and substrate side surface 24, thereby inhibiting or preventing damage of substrate 14 during leaching. As further shown in FIG. 2C, protective mask 232 may be overmolded onto at least a portion of superabrasive element 10 including the substrate side surface 24 and the superabrasive side surface 26 between the lower edge of chamfer 28 and interface 16.

Figure 3A:
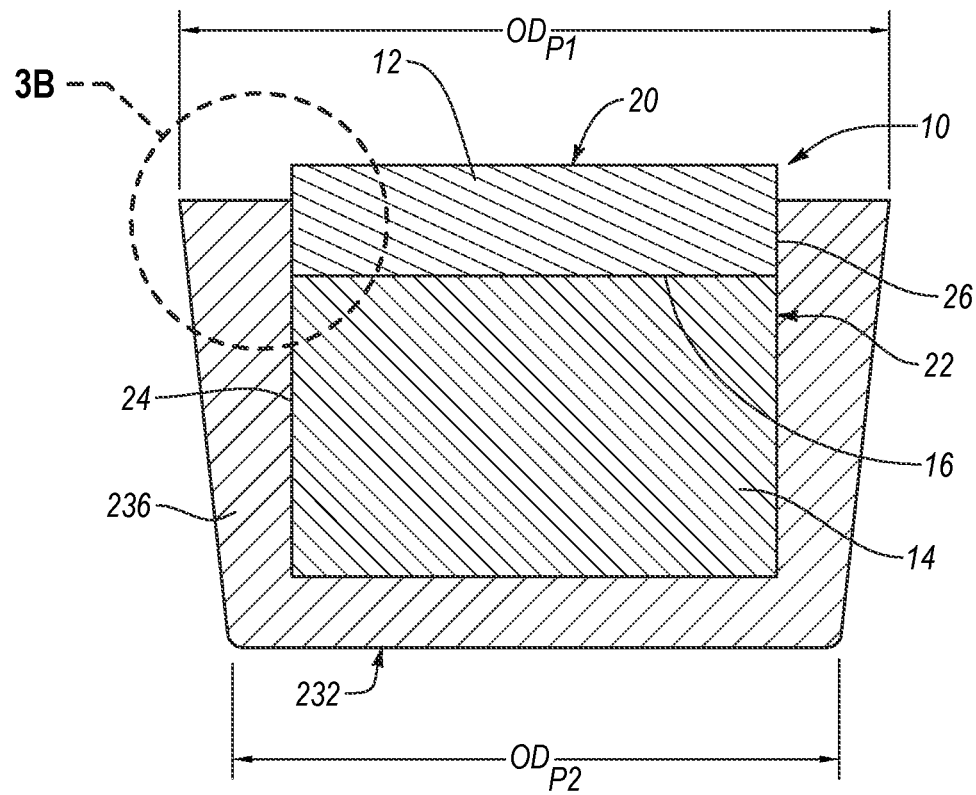
FIG. 3A is a cross-sectional view of the overmolded protective leaching mask assembly shown in FIG. 2C according to another embodiment.
Figure 3B:
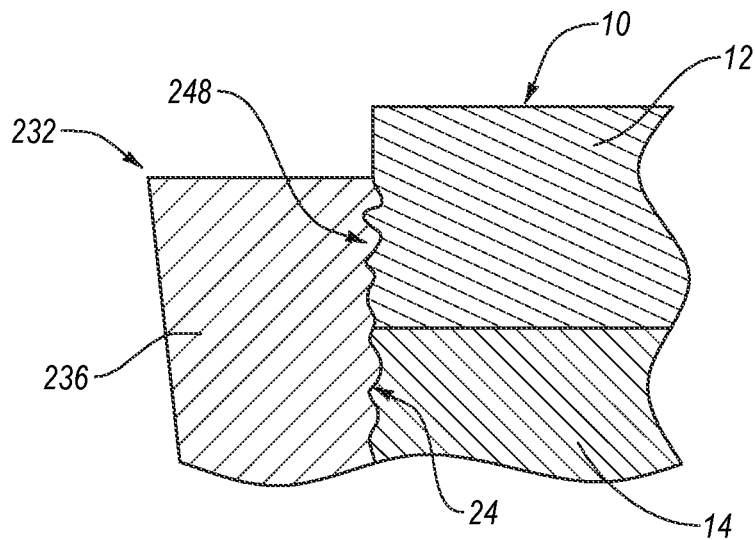
FIG. 3B is a detailed cross-sectional view of the overmolded protective leaching mask assembly shown in FIG. 3A.

Referring to FIGS. 3A and 3B, according to another embodiment, chamfer 28 may be omitted and the protective mask 232 may be overmolded onto at least a portion of the superabrasive element 10 including the substrate side surface 24 and the superabrasive side surface 26 near the superabrasive face 20. In yet other embodiments, the protective mask 232 may be overmolded onto at least a portion of the superabrasive element 10 including the substrate side surface 24 near interface 16.

During leaching, a region of superabrasive element 10 that is not covered by protective mask 232 may be exposed to a leaching solution during leaching. Additionally, the leaching solution may be inhibited or prevented from contacting a region which is covered by protective mask 232. Accordingly, the leaching solution may be inhibited or prevented from dissolving, corroding, and/or otherwise damaging portions of superabrasive element 10 at and/or near a selected portion on which protective mask 232 is overmolded. In an embodiment, the leaching solution may also be inhibited or prevented from migrating between superabrasive element 10 and protective mask 232, further protecting portions of superabrasive element 10 at and/or adjacent to the selected portions.

In an embodiment, protective mask 232 may be bonded and/or otherwise affixed to superabrasive element 10 in any suitable manner. For example, protective mask 232 may be bonded to one or more portions of element side surface 22 via one or more mechanical bonds, one or more chemical bonds, combinations thereof, or any other suitable type of bond. By overmolding protective mask 232 on superabrasive element 10, protective mask 232 may be configured to provide a higher level of bonding between superabrasive element 10 and protective mask 232 in comparison to a conventional protective leaching cup. In other embodiments, protective mask 232 may be adhered to one or more of element side surface 22 using, for example, an adhesive. In an embodiment, protective mask 232 may be at least partially bonded to one or more portions of element side surface 22 through ionic bonds, covalent bonds, and/or various intermolecular bonds.

In other embodiments, protective mask 232 may be overmolded on superabrasive element 10 such that mechanically and/or frictionally engages one or more portions of element side surface 22. For example, as protective mask 232 hardens during the molding process, protective mask 232 may shrink and/or contract, causing protective mask 232 to more closely surround superabrasive element 10, mechanically affixing protective mask 232 to superabrasive element 10. In other embodiments, one or portions of sidewalls 236 of protective mask 232 may be configured to at least partially conform to projections, cavities, indentations, and/or other surface irregularities defined by element side surface 22. By at least partially conforming to surface irregularities defined by element side surface 22, protective mask 232 may be more securely affixed or bonded to at least a portion of substrate 12 and/or superabrasive table 14. For example, one or more grooves 248 may be ground, cut, lapped, or otherwise formed in element side surface 22 as shown in FIG. 3B. Accordingly, one or more portions of protective mask 232 may be disposed between adjacent portions of substrate 14 and/or superabrasive table 12. For example, portions of protective mask 232 may at least partially fill the grooves 248 as protective mask 232 is overmolded onto superabrasive element 10. Accordingly, the interface between protective mask 232 and element side surface 22 may include alternating intermeshed portions of protective mask 232 and element side surface 22. The alternating and/or intermeshing portions of protective mask 232 and element side surface 22 may help mechanically fasten and hold protective mask 232 to superabrasive element 10.

The geometry of one or more portions of protective mask 232 may be selected to help protective mask 232 protect superabrasive element 10 during leaching. As shown in FIGS. 2A and 2C, protective mask 232 may include a base portion 234 and at least one sidewall 236 extending from base portion 234 and defining an opening generally opposite the base portion 234. Sidewall 236 of protective mask 232 may include the inner side surface 240, an outer side surface 246, and a thickness T defined between an inner surface (e.g., the inner side surface 240) and an outer surface (e.g., the outer side surface 246). As shown, in an embodiment, inner side surface 240 may be nonparallel relative to outer side surface 246 of sidewall 236 and substantially parallel relative to one or more portions of element side surface 22. The relationship between the inner side surface 240 and element side surface 22 may be configured to provide a substantially close fit between protective mask 232 and superabrasive element 10. As discussed in more detail below, the relationship between inner side surface 240 and outer side surface 246 may help eject protective leaching mask assembly 200 from an injection mold.

Protective mask 232 may be formed to any suitable thickness. For example, the thickness of protective mask 232 may be configured to help prevent a leaching solution from coming into contact with select portions of superabrasive element 10. In some embodiments, a portion of sidewall 236 nearer superabrasive table 12 may have a thickness T that is greater than a thickness T of a portion of sidewall 236 nearer rear face 18. The increased thickness T of protective mask 232 near superabrasive table 12 may help protect substrate 14 from pitting and other corrosion due to exposure to a leaching solution. In other embodiments, protective mask 232 may also be formed to exhibit a thickness that facilitates suitable bonding and/or adhesion of protective mask 232 to portions of superabrasive element 10. For example, in an embodiment, base portion 234 and sidewall 236 of protective mask 232 may exhibit a thickness T of less than about 0.1 inches. In an embodiment, one or more portions of sidewall 236 may exhibit a thickness T of less than about 0.5 inches. In other embodiments, one or more portions of sidewall 236 may exhibit a thickness T of between about 0.03 inches and about 0.25 inches. In yet other embodiments, one or more portions of sidewall 236 may exhibit a thickness T of between about 0.05 inches and about 0.15 inches. In other embodiments, one or more portions of sidewall 236 may exhibit a larger or smaller thickness T. Moreover, protective mask 232 may exhibit a relatively uniform thickness or a varying thickness. In other embodiments, one or more portions of sidewall 236 and/or base portion 234 may have different diameters and/or shapes. For example, a portion of sidewall 236 proximate to superabrasive table 12 may have a different diameter and/or shape than a portion of sidewall 236 nearer rear face 18.

Figure 2D:
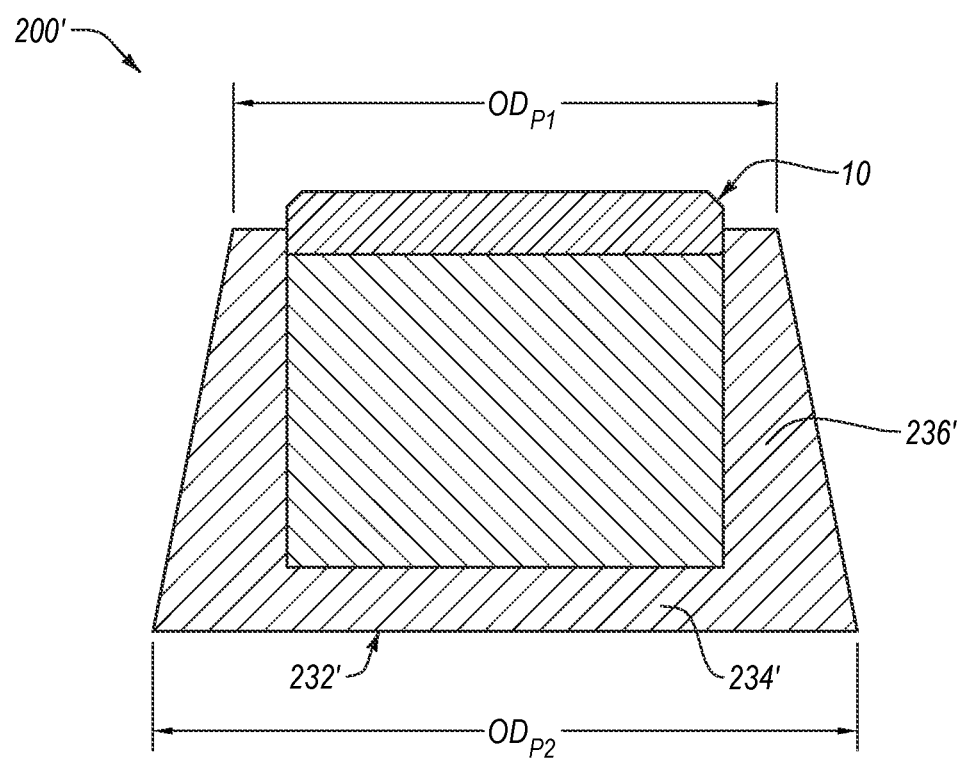
FIG. 2D is a cross-sectional view of an overmolded protective leaching mask assembly according to another embodiment.

In other embodiments, one or more portions of protective mask 232 may exhibit a draft or taper configured to help improve performance of protective leaching mask assembly 200. For example, upper portion of protective mask 232 may exhibit an outer diameter $OD_{P1}$ (shown in FIG. 3A) that is wider than an outer diameter $OD_{P2}$ (shown in FIG. 3A) of base portion 234 of protective mask 232 such that one or more portions of outer side surface 246 of sidewall 236 exhibit a draft or taper between base portion 234 and the opening. As shown, the outer diameter of protective mask 232 may increase from base portion 234 toward upper portion of protective mask 232 forming a draft or taper. In other embodiments, the outer diameter of protective mask 232 may increase from upper portion of protective mask 232 toward base portion 234 forming a draft or taper. For example, FIG. 2D illustrates a protective leaching mask assembly 200' according to another embodiment. As shown in FIG. 2D, upper portion of protective mask 232' may exhibit an outer diameter $OD_{P1}$ that is less than an outer diameter $OD_{P2}$ of base portion 234' of protective mask 232' such that the outer diameter of protective mask 232' increases from upper portion of protective mask 232' toward base portion 234' forming a draft or taper with sidewall 236'.

Referring again to FIG. 2C, the draft of sidewall 236 may form a draft angle θ between a line extending along sidewall 236 and another line extending at a right angle relative to an inner lower surface of base portion 234 such as a central axis of the superabrasive element 10. In an embodiment, the draft angle θ of sidewall 236 may be selected to allow for easier ejection of protective mask 232 from an injection mold. For example, one or more portions of outer side surface 246 may be configured to exhibit a draft angle θ of greater than about one-fourth (¼) degree. In other embodiments, one or more portions of outer side surface 246 may be configured to exhibit a draft angle θ of between about one-fourth (¼) degree and about seven (7) degrees; about half (½) degree and about three (2) degrees; about two (2) degrees and about four (4) degrees; about four (4) degrees and about six (6) degrees; or about one (1) degree and about two (2) degrees. In other embodiments, one or more portions of outer side surface 246 may exhibit a greater or lesser draft angle θ. Such a configuration may help facilitate loading or positioning of a binding member (e.g., binding member 250) onto protective mask 232. In addition, the draft or taper of sidewall 236 may help vary the thickness T of sidewall 236. Such a configuration may also help release protective leaching mask assembly 200 from a mold cavity upon overmolding of protective mask 232 on superabrasive element 10. In some embodiments, protective mask 232 may include one or more radii 262. For example, protective mask 232 may include one or more radii 262 extending between sidewall 236 and base portion 234. Such a configuration may help reduce failure of protective mask 232, stress concentrations, and/or poor flow patterns during the overmold process.

Protective mask 232 may be substantially removed from superabrasive element 10 using any suitable technique, including, for example, machining, lapping, grinding, crushing, breaking, grit-blasting, chemical treatments, combinations of the foregoing, or otherwise physically and/or chemically removing protective mask 232 from superabrasive element 10.

Figure 4A:
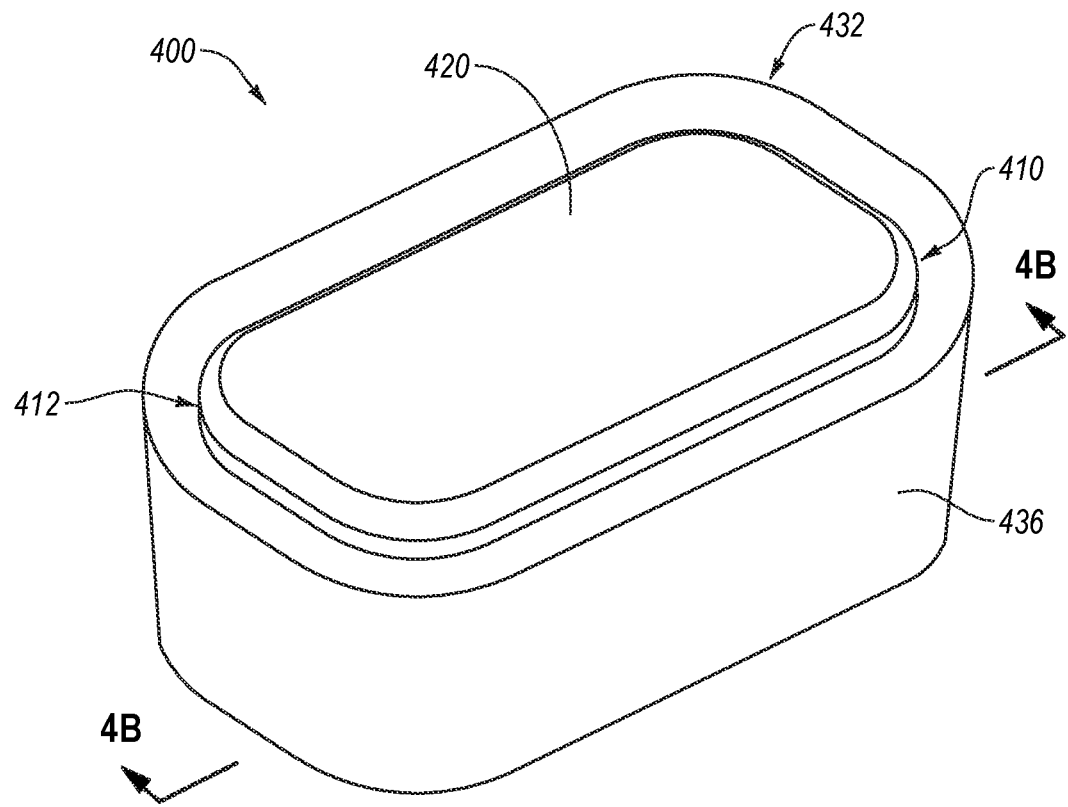
FIG. 4A is an isometric view of an overmolded protective leaching mask assembly according to another embodiment.
Figure 4B:
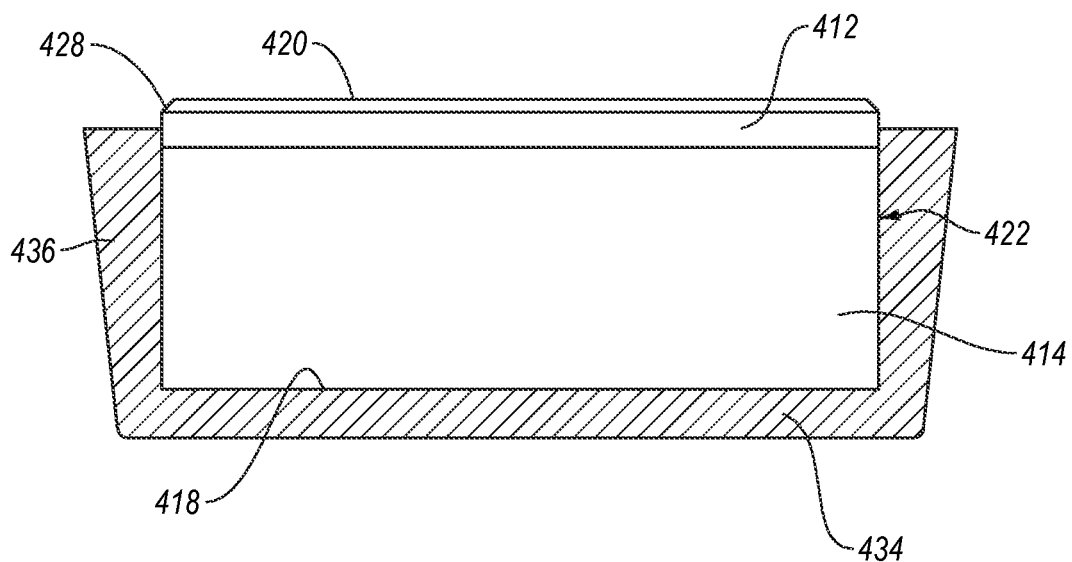
FIG. 4B is a cross-sectional view of the overmolded protective leaching mask assembly shown in FIG. 4A taken along section line 4B-4B.

It is contemplated herein that the protective leaching mask assemblies disclosed herein may exhibit any suitable, size, shape, geometry, or combinations thereof, without limitation. For example, in an embodiment, a protective leaching mask assembly may be non-cylindrical. FIGS. 4A and 4B illustrate a protective leaching mask assembly 400 similar to protective leaching mask assembly 200, except that protective leaching mask assembly 400 includes a protective mask 432 overmolded on a superabrasive element 410 having a substantially rounded rectangular shape. As shown, superabrasive element 410 may include a superabrasive table 412 affixed to or formed upon a substrate 414. Superabrasive element 410 may include a rear face 418, a superabrasive face 420, a chamfer 428 formed by superabrasive table 412, and an element side surface 422. Superabrasive element 410 may exhibit a generally rounded rectangular shape.

Protective mask 432 may include a base portion 434 and at least one sidewall 436 extending from base portion 434 defining an opening generally opposite the base portion 434. Protective mask 432 may be selectively overmolded on one or more portions of superabrasive element 410 in any pattern, design, or as otherwise desired, without limitation. When superabrasive element 410 is exposed to a leaching solution, protective mask 432 may be configured to substantially cover and/or bond to one or more portions of superabrasive element 410 in order to help prevent leaching solution or other liquids from contacting and/or damaging the one or more portions of element side surface 422 (e.g., a substrate side surface) and rear face 418. Similar to protective mask 232, protective mask 432 may be bonded, affixed, and/or otherwise adhered to superabrasive element 410 in any suitable manner. For example, protective mask 432 may be bonded to one or more portions of element side surface 422 via one or more mechanical bonds, one or more chemical bonds, combinations thereof, or any other suitable bond type. Moreover, like protective mask 232, protective mask 432 may include any suitable material. For example, protective mask 432 may include one or more materials that are substantially inert and/or otherwise resistant to acids, bases, and/or other reactive compounds present in a leaching solution used to leach superabrasive element 410. In an embodiment, protective mask 432 may include one or more thermoplastic polymer materials, including, without limitation, a fluoropolymer, polypropylene, polyvinylidene fluoride, polyvinyl chloride, polytetrafluoroethylene, polyvinylidene difluoride, or combinations of the foregoing.

Figure 5A:
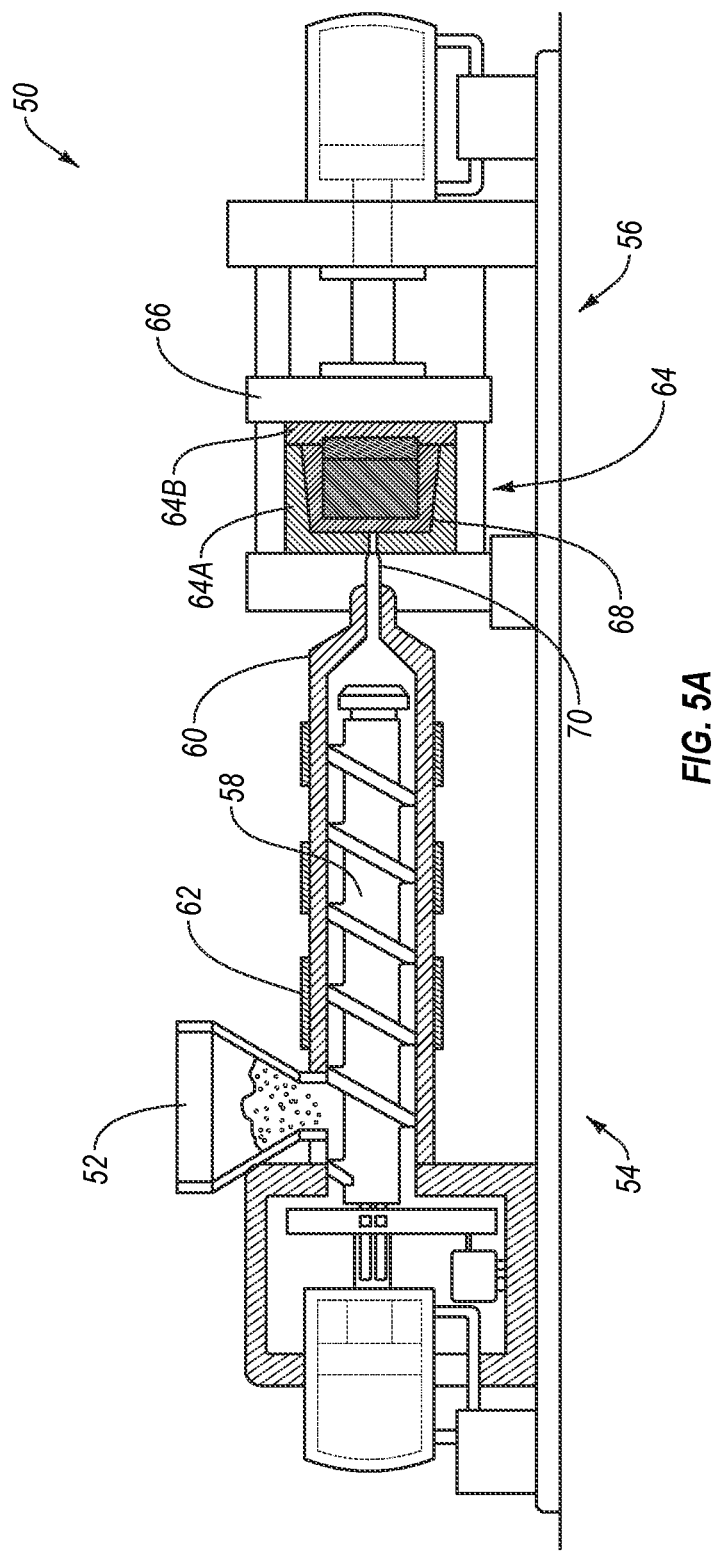
FIG. 5A is a cross-sectional view of an injection mold press having an injection system and clamping system for injection molding any of the overmolded protective masks disclosed herein.

As disclosed in co-pending application Ser. No. 12/555,715, protective masks described herein may be overmolded on the superabrasive elements in any suitable manner. For example, without limitation, via injection molding, insert molding, multiple material molding, thin wall injection molding, gas-assist molding, injection compression molding, or any other suitable molding technique may be utilized for overmolding a protective mask on superabrasive elements. FIG. 5A is a side cross-sectional view of an embodiment injection molding press 50 that may be utilized to manufacture any of the protective leaching mask assemblies disclosed herein. The injection mold press 50 is an example of suitable injection molding equipment and techniques, although the particular configuration or operation of the injection molding press 50 may vary in some regards with respect to other machines or processes. In the illustrated embodiment, injection molding press 50 includes a material hopper 52, an injection system 54, and a clamping system 56. In an embodiment, materials or material pellets may be placed within the material hopper 52, and gravity fed or force fed into the injection system 54. In an embodiment, the materials or material pellets may include any suitable materials. For example, the material pellets may include one or more thermoplastic polymer materials, including, without limitation, a fluoropolymer, polypropylene, polyvinylidene fluoride, polyvinyl chloride, polytetrafluoroehtylene, polyvinylidene difluoride, or combinations thereof.

Figure 5B:
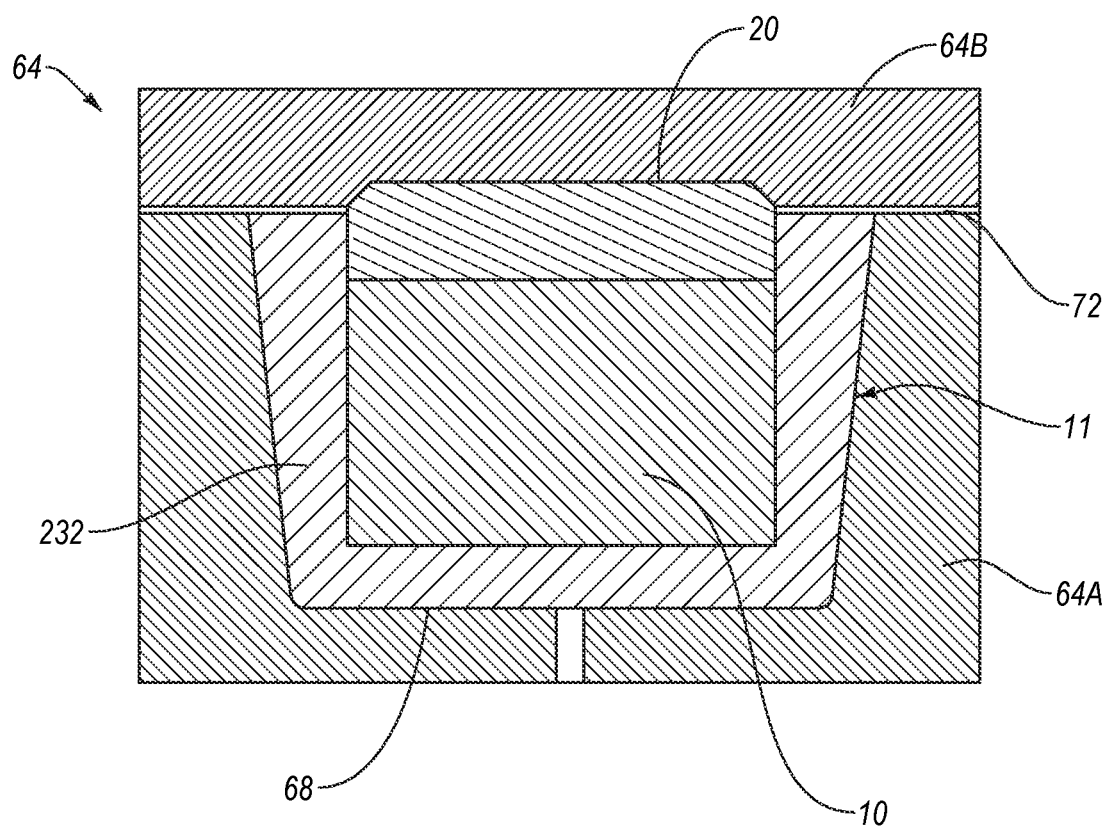
FIG. 5B is a cross-sectional view of the injection mold assembly shown in FIG. 5A.

The injection system 54 may include a reciprocating screw 58 that rotates within a barrel 60. A heater 62 may surround the barrel 60 or otherwise operate to at least partially or completely melt the received pellets. The melted material is conveyed by the reciprocating screw 58 towards the clamping system 56. The clamping system 56 includes a mold 64 having two plates 64A, 64B. A stationary plate 64A remains in a generally fixed position, while a moving plate 64B is connected to a moveable platen 66. The moveable platen 66 may be selectively moved. As the moveable platen 66 moves, the moving plate 64B also moves in a corresponding direction, which may open or close the mold 64 based on the travel direction. The stationary and moving plates 64A, 64B collectively define a mold cavity 68 and, when the mold 64 is in a closed position, the mold cavity 68 is closed between the two plates 64A, 64B. As shown in FIG. 5B, vents 72 may be formed between the stationary and moving plates 64A, 64B. The vents may be sized and configured to allow air and other gases in the mold cavity 68 to leave the injection molding press 50 as a melted material flows into the mold cavity 68. Such a configuration may allow for greater injection rates, a more uniform protective mask, and increased strength in the protective masks.

The injection system 54, which is operably coupled to the material hopper 52 and the mold 64, is configured to receive the material pellets from the material hopper 52 and convey the melted materials into the mold cavity 68. In an embodiment, the superabrasive element 10 may be selectively positioned in the mold cavity 68 with the mold 64 in an open position. The moveable platen 66 may then be moved to move the mold 64 in the closed or clamped position. With the mold 64 in the closed position, molten material (e.g., polypropylene) may be forced by the reciprocating screw 58 through a nozzle 70 and into the cavity 68 onto one or more selected portions of the superabrasive element 10. The injected material may then be allowed to cool forming a protective leaching mask assembly 11 including a protective mask 232 formed on the superabrasive element 10. As the injected material cools, the injected material may bond and/or otherwise affix to the superabrasive element 10. After cooling, the mold 64 is opened, and ejector pins may be used to extract the protective leaching mask assembly 11 from the mold 64. In some embodiments, additional shots of injected material may be forced through the nozzle 70 to form one or more additional layers of the protective mask 232 before protective leaching mask assembly 11 is ejected from the mold 64.

As discussed above, sidewalls of the mold cavity 68 may be sloped such that the sidewalls of the protective mask 232 exhibit a draft or taper. Such a configuration may allow for easier ejection of the protective leaching mask assembly 11 from the mold 64. In addition, the presence of radii in the corners of the mold cavity 68 may help reduce localized stresses in the protective mask 232.

Figure 5C:
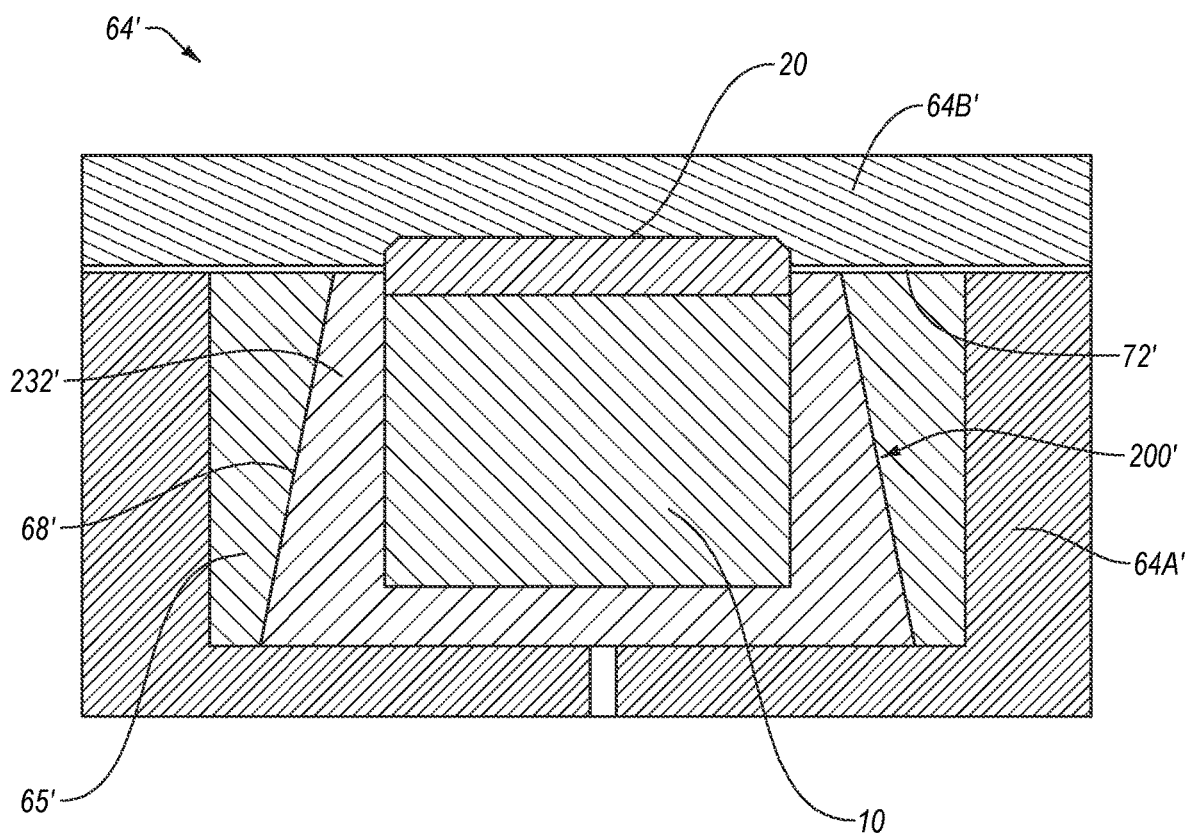
FIG. 5C is a cross-sectional view of an injection mold assembly according to another embodiment.

FIG. 5C illustrates a mold 64' according to another embodiment. Mold 64' may include two plates 64A', 64B'. A stationary plate 64A' remains in a generally fixed position, while a moving plate 64B' is connected to the moveable platen 66 (shown in FIG. 5A) and is moveable. An insert 65' may be removably positioned in the stationary plate 64A'. In an embodiment, insert 65' may comprise a single member. In other embodiments, insert 65' may comprise two, three, or any other suitable number of members. The stationary plate 64A', the moving plate 64B' and the insert 65' may collectively define a mold cavity 68' and, when the mold 64' is in a closed position, the mold cavity 68' is closed between the two plates 64A', 64B' and insert 65'. Like mold 64, vents 72' may be formed between the stationary and moving plates 64A', 64B'. With the mold 64' in the closed position, molten material may be forced into the cavity 68' onto one or more selected portions of the superabrasive element 10. The injected material may then be allowed to cool forming the protective mask assembly 200', including a protective mask 232' formed on the superabrasive element 10.

As shown, insert 65' may include an inner surface that is tapered or sloped such that the outer diameter of the protective mask 232' increases from the top edge toward the base portion forming a draft or taper. In addition, insert 65' may include an outer surface that generally corresponds to the sidewalls of the stationary plate 64A'. Such a configuration may allow for easier ejection of the protective leaching mask assembly 200' and insert 65' from the mold 64'. For example, after cooling, the mold 64' may be opened and ejector pins may be used to extract the protective leaching mask assembly 200' and insert 65' from the mold 64'. After removal from the mold 64', the protective leaching mask assembly 200' may be removed from the insert 65'.

Figure 6A:
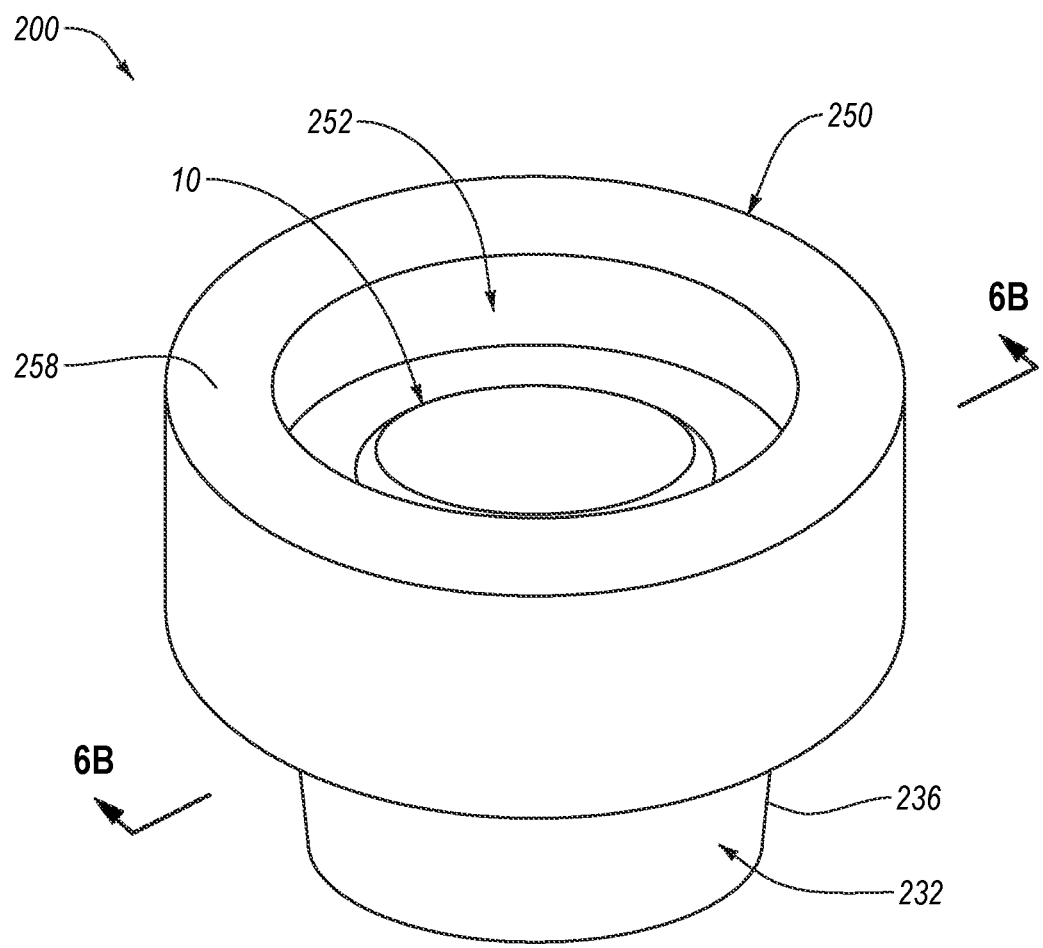
FIG. 6A is an isometric view of an overmolded protective leaching mask assembly according to another embodiment.
Figure 6B:
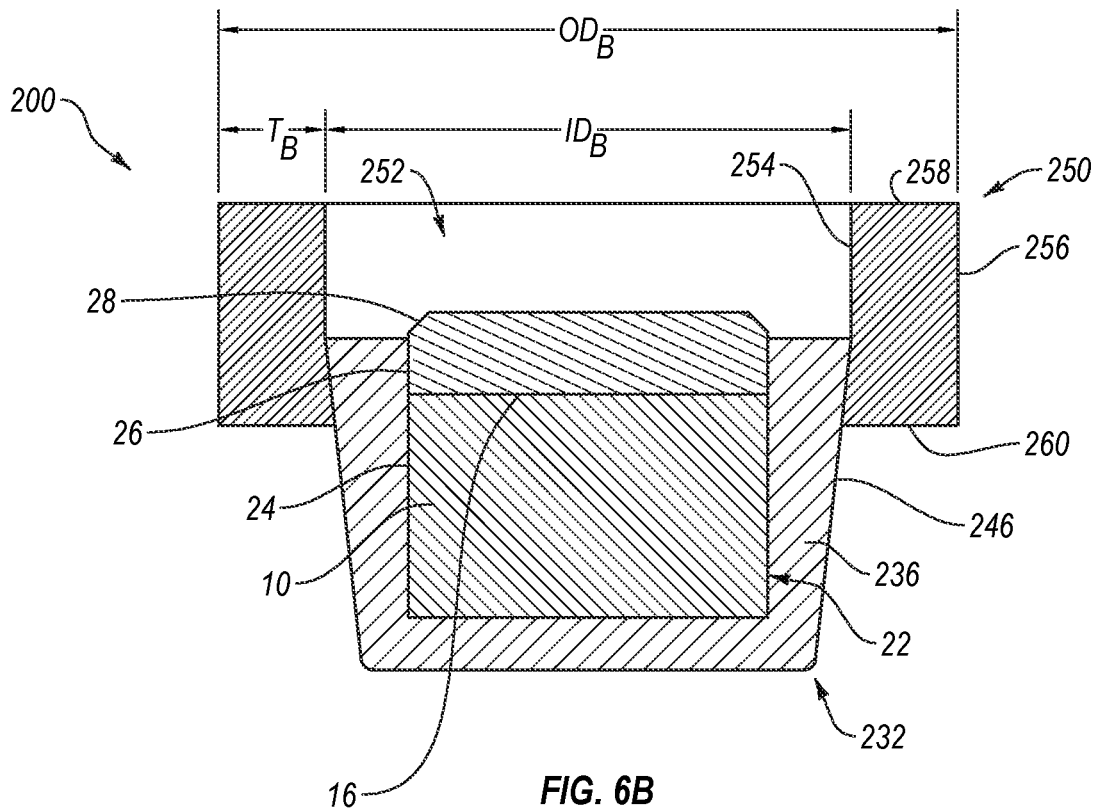
FIG. 6B is a cross-sectional view of the overmolded protective leaching mask assembly shown in FIG. 6A taken along section line 6B-6B.

In an embodiment, heat and/or pressure may be applied to a protective mask to cause a portion of a protective mask abutting element side surface to more closely conform to one or more portions of element side surface of the superabrasive element. For example, referring to FIGS. 6A and 6B, according to another embodiment, protective leaching mask assembly 200 (described in relation to FIGS. 1A through 3B) may further include a binding member 250 selectively positioned on protective mask 232. Binding member 250 may be selectively positioned or loaded onto protective mask 232 to help prevent damage to superabrasive element 10 during leaching. In an embodiment, binding member 250 may be interference fit (e.g., press fit, shrink fit, combinations thereof, and/or otherwise loaded onto protective mask 232) in any suitable manner. For example, binding member 250 may be sized and configured such that an interference fit is created between protective mask 232 and binding member 250. In an embodiment, binding member 250 may exert a contact pressure on sidewall 236 that does not exceed a yield stress of binding member 250, sidewall 236, and or element side surface 22 such that binding member 250 creates an interference fit with select portions of sidewall 236. Thus, binding member 250 may help the selected portions of sidewall 236 more closely conform to element side surface 22. In an embodiment, an interference between binding member 250 and protective mask 232 may be less than about 0.200 inches (e.g., about 0.100 inches), less than about 0.100 inches, less than about 0.080 inches, less than about 0.050 inches, less than about 0.040 inches (e.g., about 0.035 inches), less than about 0.020 inches, or less than about 0.010 inches. In other embodiments, the interference between binding member 250 and protective mask 232 may be between about 0.003 inches and about 0.030 inches; between about 0.005 inches and about 0.020 inches; between about 0.008 inches and about 0.016 inches; or between about 0.010 inches and about 0.012 inches. In other embodiments, the interference between the binding member 250 and protective mask 232 may be larger or smaller. Optionally, prior to loading binding member 250 onto protective mask 232, binding member 250 and/or protective mask 232 may be heated to an elevated temperature to facilitate positioning of binding member 250 about protective mask 232.

Binding member 250 may include any suitable material. For example, binding member 250 may include polytetrafluoroethylene (e.g., TEFLON®), polyphenylene, polypropylene, ultra-high-molecular weight polyethylene, metals, alloys, composite materials, combinations thereof, or any other suitable type of material. In other embodiments, binding member 250 may include one or more resilient materials. In yet other embodiments, binding member 250 may include one or more shape memory materials. In an embodiment, binding member 250 and protective mask 232 may include different materials. In other embodiments, binding member 250 and protective mask 232 may include the same materials. In an embodiment, binding member 250 may be configured to include one or more resilient materials configured to help binding member 250 apply a compressive force against protective mask 232.

In other embodiments, binding member 250 and protective mask 232 may include one or more flexible and/or semi-flexible materials. In yet other embodiments, binding member 250 may be configured to exhibit a flexural modulus that exceeds a flexural modulus of protective mask 232. For example, the flexural modulus of binding member 250 may be at least six times (6) greater, or about at least three (3) times greater than a flexural modulus of one or more portions of protective mask 232. In other embodiments, the flexural modulus of binding member 250 may be between about one (1) time and about eight (8) times, about two (2) times and about six (6) times, or about three (3) times and about five (5) times greater than protective mask 232. In other embodiments, the difference between the flexural modulus of binding member 250 and protective mask 232 may be greater or less. The difference between the flexural modulus of the binding member 250 and protective mask 232 may allow binding member 250 to compress the protective mask 232 against superabrasive element 10. Moreover, because of the compressive force exerted by binding member 250 on protective mask 232, protective leaching mask assembly 200 may enable superabrasive element 10 to be exposed to a leaching agent without the use of a conventional leaching tray.

In other embodiments, protective mask 232 may be configured to exhibit a flexural modulus that exceeds a flexural modulus of binding member 250. For example, the flexural modulus of protective mask 232 may be at least six times (6) greater, or about at least three (3) times greater than a flexural modulus of binding member 250. In other embodiments, the flexural modulus of protective mask 232 may be between about one (1) time and about eight (8) times, about two (2) times and about six (6) times, or about three (3) times and about five (5) times greater than binding member 250. Such a configuration may help elastically load binding member 250 on protective mask 232.

Figure 6C:
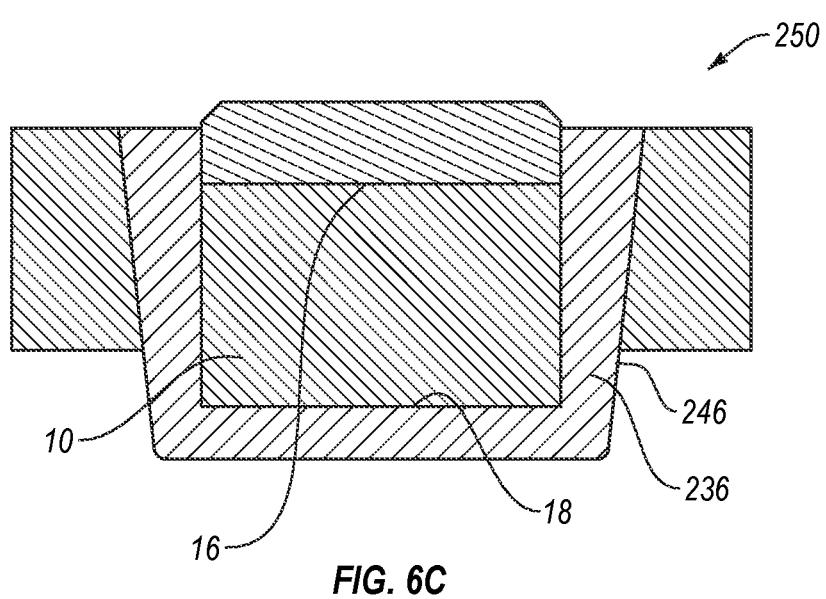
FIG. 6C is a cross-sectional view of the overmolded protective leaching mask assembly shown in FIG. 6A according to another embodiment.

Binding member 250 may be positioned on protective mask 232 in any suitable manner. For example, binding member 250 may be selectively positioned or loaded onto a portion of outer surface 246 of sidewall 236 extending between substrate side surface 24 near interface 16 and superabrasive side surface 26 near chamfer 28. In an embodiment, binding member 250 may be positioned about the periphery of a top edge of protective mask 232. In other embodiments, binding member 250 may be selectively positioned or loaded onto a portion of outer portion 246 of sidewall 236 extending between interface 16 and chamfer 28, a portion of outer portion 246 between substrate side surface 24 and interface 16, or in any other suitable location. In yet other embodiments, binding member 250 may be selectively positioned and/or loaded onto protective mask 232 such that binding member 250 overlaps more than half of sidewall 236. For example, as shown in FIG. 6C, binding member 250 may be selectively positioned or loaded onto a portion of outer portion 246 of sidewall 236 extending between the top edge of protective mask 232 and a location toward rear face 18.

Referring again to FIG. 6B, in an embodiment, binding member 250 may include a ring-like member defining an opening 252 through which at least a portion of protective mask 232 may selectively extend. In an embodiment, binding member 250 may have an upper surface 258, a lower surface 260, an inner surface 254 extending between upper surface 258 and lower surface 260, and an outer surface 256 substantially parallel relative to inner surface 254. In other embodiments, inner surface 254 may be non-parallel relative to outer surface 256. Opening 252 may at least partially define an inner diameter $ID_B$ and outer surface 256 may at least partially define an outer diameter $OD_B$.

In an embodiment, outer diameter $OD_B$ may be between about one-half (½) inch and about three (3) inches, about three quarters (¾) of an inch and about two (2) inches, or about one (1) inch and about one and a half (1½) inches. In other embodiments, outer diameter $OD_B$ may be larger or smaller. Opening 252 may be configured to exhibit one or more geometric shapes generally corresponding to a peripheral shape of protective mask 232. For example, opening 252 may exhibit a generally cylindrical shape. In other embodiments, opening 252 may exhibit a generally conical shape, a generally rectangular shape, a generally oval-like shape, or any other suitable shape. Moreover, while binding member 250 is illustrated exhibiting a generally ring-like shape, in other embodiments, binding member 250 may exhibit a generally torus shape, a generally frustoconical shape, a generally elliptical shape, or any other suitable shape. Optionally, binding member 250 may include one or more features configured to help binding member 250 grip, interlock with, or hold onto protective mask 232. For example, one or more portions of inner surface 254 may include one or more adhesives configured to help binding member 250 hold onto protective mask 232. In other embodiments, one or more portions of inner surface 254 of binding member 250 may include a textured surface, an engagement feature, or other geometric feature configured to help binding member 250 grip protective mask 232.

Binding member 250 may exhibit a thickness $T_B$ at least partially defined between inner surface 254 and outer surface 256. In an embodiment, thickness $T_B$ may be generally uniform. In other embodiments, thickness $T_B$ may be variable. In an embodiment, thickness $T_B$ may be less than about one (1) inch, less than about one-half (½) inch, less than about three-eighths (⅜) of an inch, or greater than about one-fourth (¼) of an inch. In other embodiments, thickness $T_B$ may be between about one-fourth (¼) of an inch and about two (2) inches, or about three-eighths (⅜) of an inch and about one (1) inch. In other embodiments, thickness $T_B$ may be greater or less.

In an embodiment, binding member 250 may include one or more materials including a selected elasticity such that binding member 250 elastically deforms as protective mask 232 and superabrasive element 10 are loaded into binding member 250. As noted above, the size, shape, and/or configuration of opening 252 may be selected such that an interference fit is created between protective mask 232 and binding member 250. For example, an interference between binding member 250 and protective mask 232 may be less than about 0.200 inches (e.g., about 0.100 inches), less than about 0.100 inches, less than about 0.080 inches, less than about 0.050 inches, less than about 0.040 inches (e.g., about 0.035 inches), less than about 0.020 inches, or less than about 0.010 inches. Accordingly, binding member 250 may help prevent leaching superabrasive element 10 by pushing sidewall 236 of protective mask 232 against superabrasive element 10.

Figure 6D:
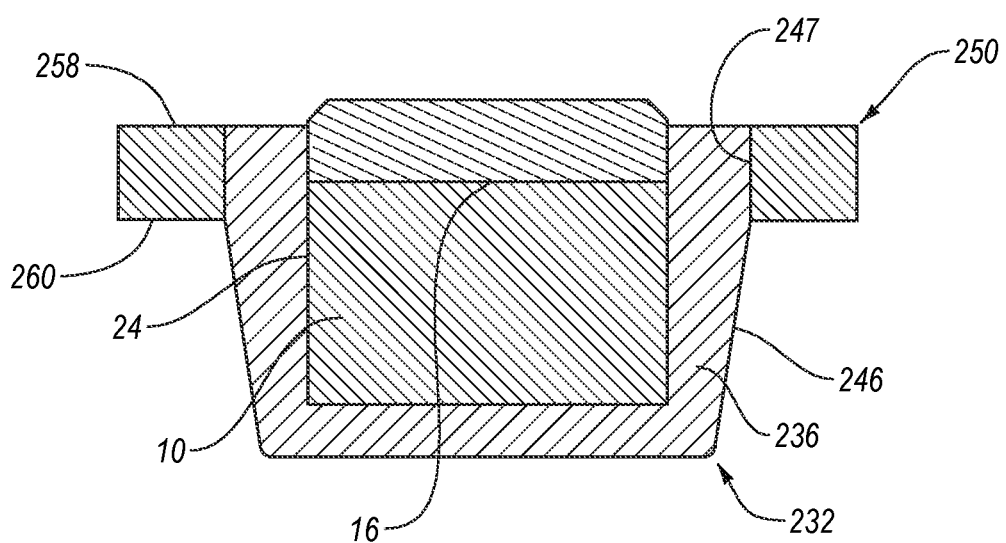
FIG. 6D is a cross-sectional view of the overmolded protective leaching mask assembly shown in FIG. 6A according to another embodiment

In an embodiment, protective mask 232 may include a binding member loading portion configured to facilitate loading and/or positioning of binding member 250 on protective mask 232. For example, as shown in FIG. 6D, a binding member loading portion 247 may include a generally constant diameter portion of outer portion 246 located between the top edge of protective mask 232 and a location between substrate side surface 24 and interface 16. In an embodiment, binding member 250 may be sized and configured to generally correspond to the binding member loading portion 247 of protective mask 232. For example, the height of binding member 250 (e.g., distance between the upper and lower surfaces 258, 260) may be substantially the same as the height of the binding member loading portion 247. Such a configuration may help concentrate and/or direct compressive forces exerted by binding member 250 on the protective mask 232.

While binding member loading portion 247 is shown located between the top edge and a location between substrate side surface 24 and interface 16, in other embodiments, binding member loading portion 247 may be located at any suitable location on outer portion 246 of protective mask 232. For example, in an embodiment, binding member loading portion 247 may be located below the top edge and between substrate side surface 24 near interface 16 and superabrasive side surface 26 near chamfer 28.

Figure 7A:
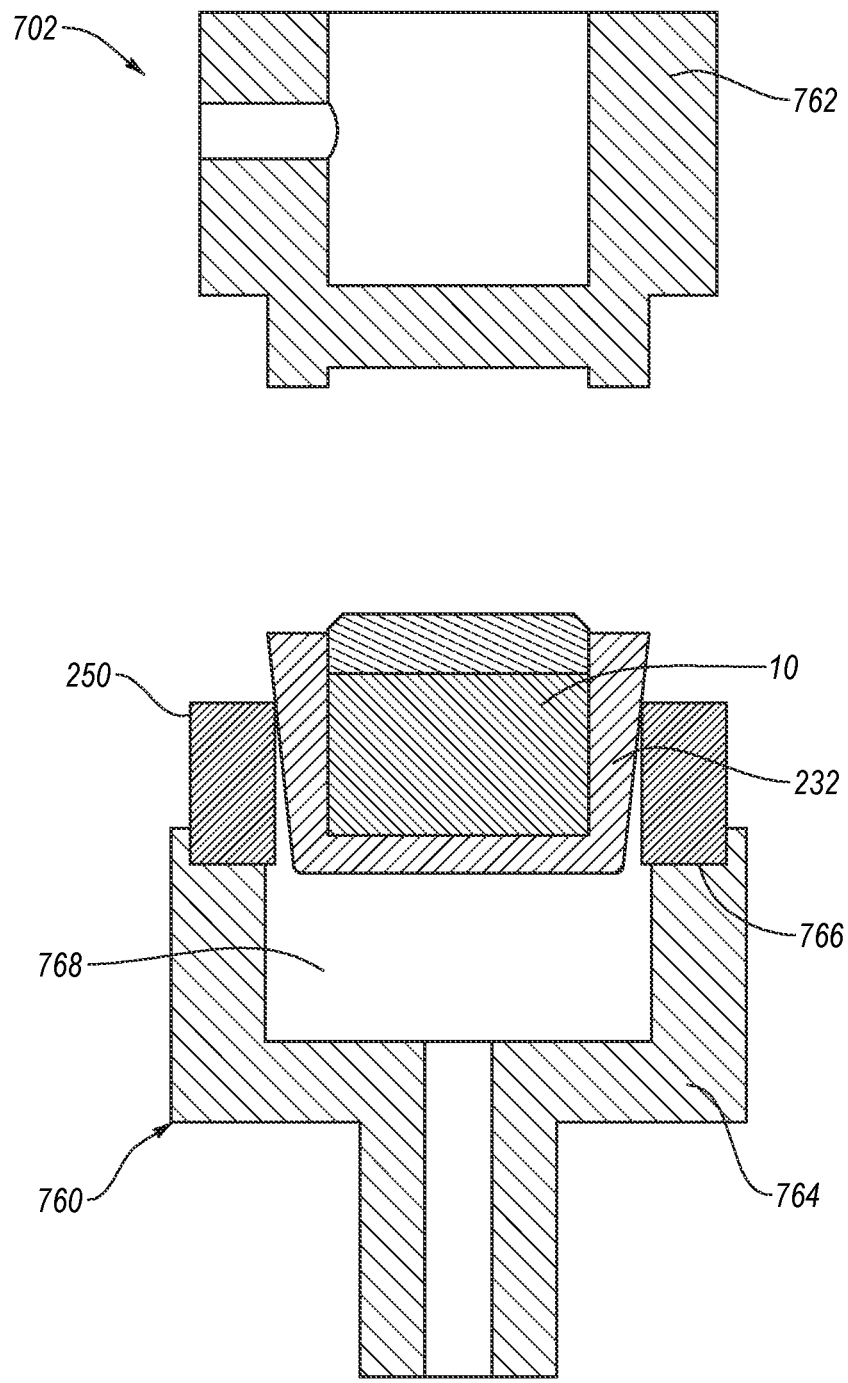
FIG. 7A through 7C illustrate a method for mounting a binding member onto an overmolded protective leaching mask according to an embodiment.
Figure 7B:
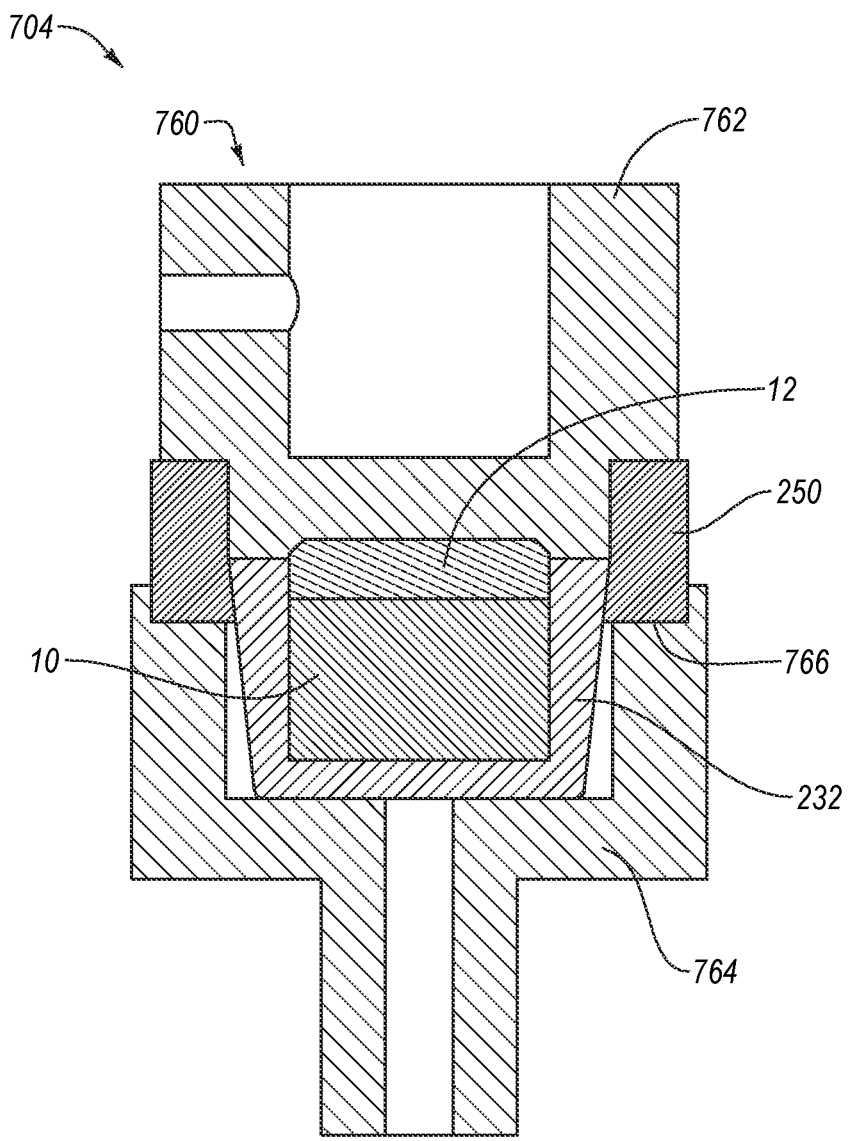
Figure 7C:
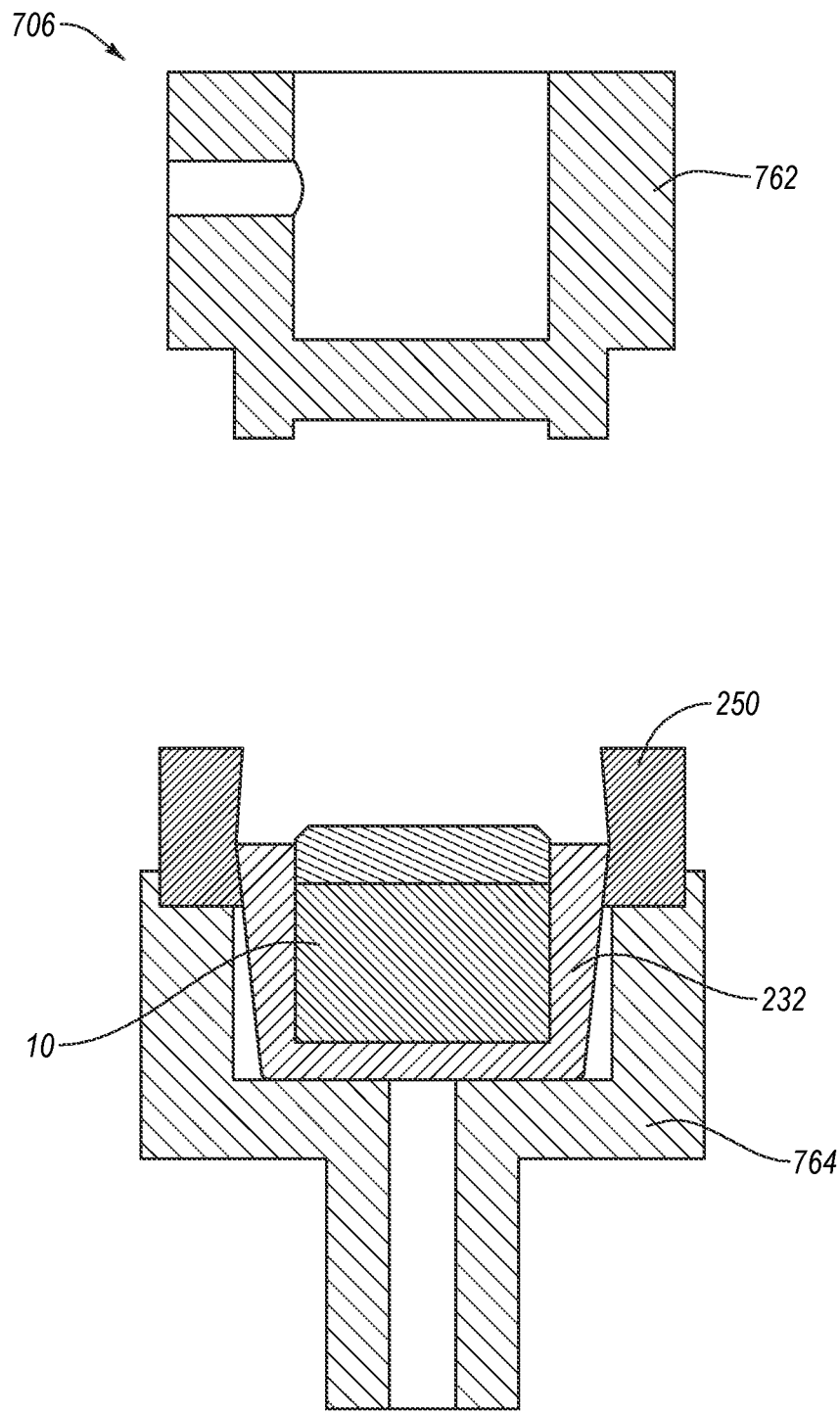

FIGS. 7A through 7C illustrate a method 700 of mounting binding member 250 onto protective mask 232 and superabrasive element 10 according to an embodiment. As shown in FIG. 7A, at step 702, binding member 250 may be positioned on a press 760. Press 760 may include any suitable type of press including, without limitation, a hydraulic press, a mechanical press, or a pneumatic press. Press 760 may include a base member 764 and a ram member 762, which is mounted for reciprocation with respect to base member 764. In an embodiment, base member 764 may include a recess 766 configured to receive at least a portion of binding member 250 and an internal cavity 768 configured to receive at least a portion of protective mask 232 and superabrasive element 10. As shown, at least a bottom portion of binding member 250 may be positioned in recess 766 of base member 764. Base portion of protective mask 232 and superabrasive element 10 may be positioned on an upper portion of binding member 250 such that protective mask 232 and superabrasive element 10 are positioned between ram member 762 and binding member 250.

At step 704, ram member 762 may be moved toward base member 764 such that at least a portion the protective mask 232 and superabrasive element 10 are press fit through opening 252 of binding member 250 and into cavity of base member 764. In an embodiment, the draft or taper of sidewall 236 of protective mask 232 may be configured to help load protective mask 232 into binding member 250 and/or protective superabrasive element 10. For example, the diameter of an upper peripheral surface of protective mask 232 may be greater than the diameter $ID_B$ of opening 252 of binding member 250. In addition, the diameter $OD_{P2}$ (shown in FIG. 3A) of base portion 234 of protective mask 232 may be less than the diameter of opening 252 of binding member 250. As a result, base portion 242 of protective mask 232 may be more easily positioned within opening 252 prior to loading. In addition, as ram member 762 pushes protective mask 232 further through opening 252 of binding member 250, the protective mask 232 becomes more wedged inside of opening 252. Thus, a greater compressive force against the protective mask 232 is generated as the binding member 250 moves closer to superabrasive table 12 of superabrasive element 10. Such a configuration may help protective mask 232 create a tighter fit with superabrasive element 10 to further prevent or inhibit a leaching solution from passing between protective mask 232 and superabrasive element 10.

In other embodiments, movement of ram member 762 relative to base member 764 may be controlled to selectively position binding member 250 on protective mask 232 and superabrasive element 10. For example, ram member 762 may be moved a selected distance toward base member 764 such that binding member 250 is positioned over a portion of outer surface 246 of sidewall 236 extending between substrate side surface 24 near interface 16 and superabrasive side surface 26 near chamfer 28. In an embodiment, ram member 762 may be moved a selected distance toward base member 764 such that binding member 250 is positioned about the periphery of a top edge of protective mask 232. In another embodiment, ram member 762 may be moved a selected distance toward base member 764 such that binding member 250 is positioned over a portion of outer surface 246 of sidewall 236 extending between interface 16 and chamfer 28, a portion of outer surface 246 between substrate side surface 24 and interface 16, or in any other suitable location.

At step 706, ram member 762 may be reciprocated away from base member 764 and protective mask 232 and binding member 250 may be removed from press 760. While method 700 is illustrated using a press, it will be appreciated that binding member 250 may be loaded unto protective mask 232 in any suitable manner. For example, binding member 250 may be manually loaded onto protective mask 232. In other embodiments, binding member 250 may be shrink fitted onto protective mask 232. In yet other embodiments, binding member 250 may be selectively tightened onto protective mask 232 using one or more mechanical fasteners.

Figure 8:
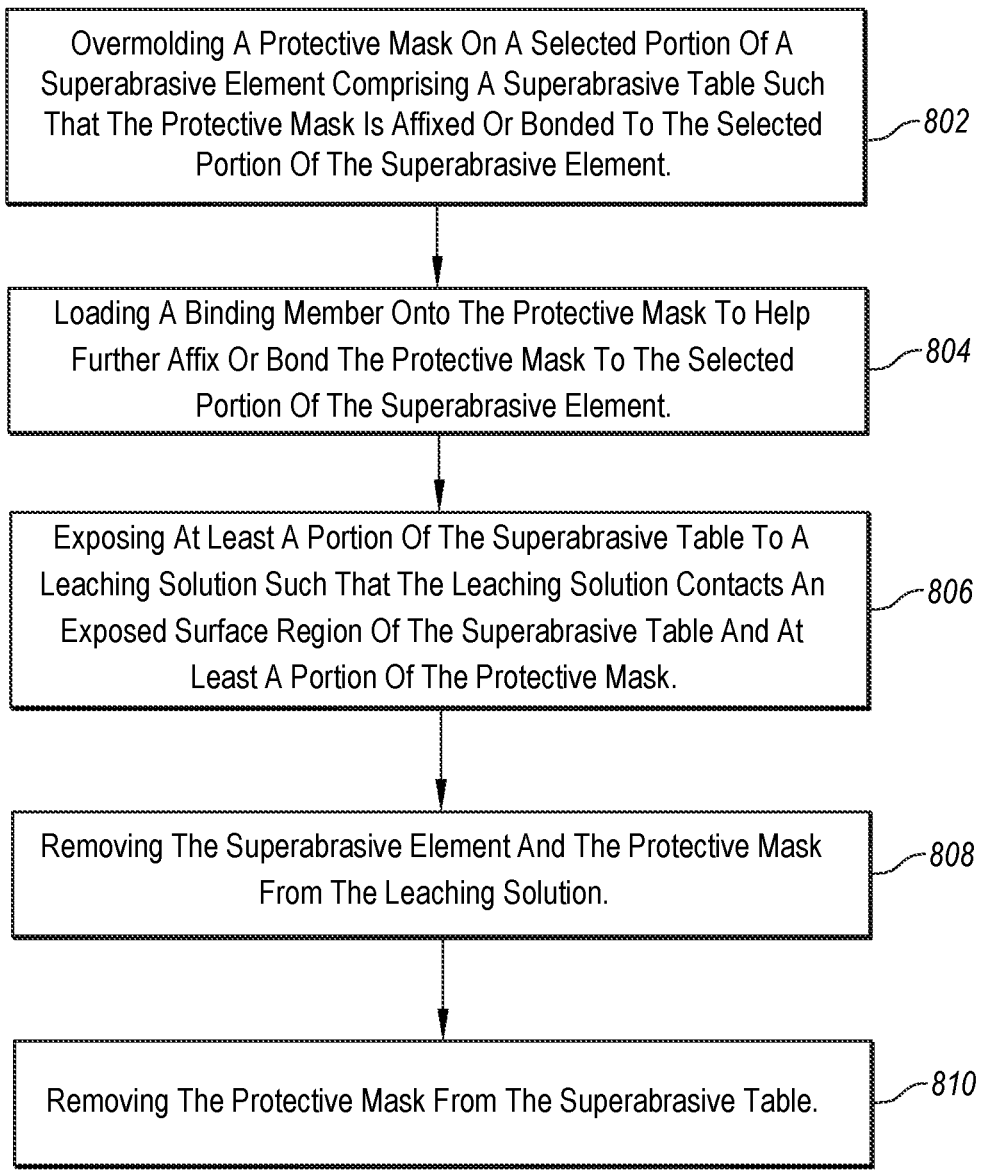
FIG. 8 is a flow diagram of a method of processing a polycrystalline diamond element according to an embodiment.

FIG. 8 illustrates a method 800 of processing a superabrasive element according to an embodiment. As shown in FIG. 8, at step 802, a protective mask may be overmolded on a selected portion of superabrasive element (e.g., a polycrystalline element) including a superabrasive table such that the protective mask is affixed and/or bonded to the selected portion of the superabrasive element. The protective mask may be bonded and/or otherwise affixed to the superabrasive element in any suitable manner disclosed herein. For example, the protective mask may be bonded to one or more portions of the element side surface via one or more mechanical bonds, one or more chemical bonds, combinations thereof, or any other suitable type of bond. Moreover, the protective mask may include any suitable material, including, for example, without limitation, one or more thermoplastic polymer materials, including, without limitation, a fluoropolymer, polypropylene, polyvinylidene fluoride, polyvinyl chloride, polytetrafluoroethylene, polyvinylidene difluoride, or combinations of the foregoing. In an embodiment, at step 804, a binding member may be loaded onto the protective mask to help further bond or affix the protective mask to the selected portion of the superabrasive element.

At step 806, at least a portion of the superabrasive table may be exposed to a leaching solution such that the leaching solution contacts an exposed surface region of the superabrasive table and at least a portion of the protective mask. Because the protective mask is bonded and/or otherwise affixed to the selected portion of the superabrasive element, the protective mask may enable the superabrasive element to be exposed to a leaching solution for relatively longer periods of time and/or to relatively stronger leaching solutions than conventional masking techniques. Additionally, the superabrasive element may be exposed to a leaching solution under conditions such as elevated temperatures and/or reduced pressures.

At step 808, the superabrasive element and protective mask may be removed from the leaching solution. At step 810, the protective mask may be substantially removed from the superabrasive table.

Figure 9:
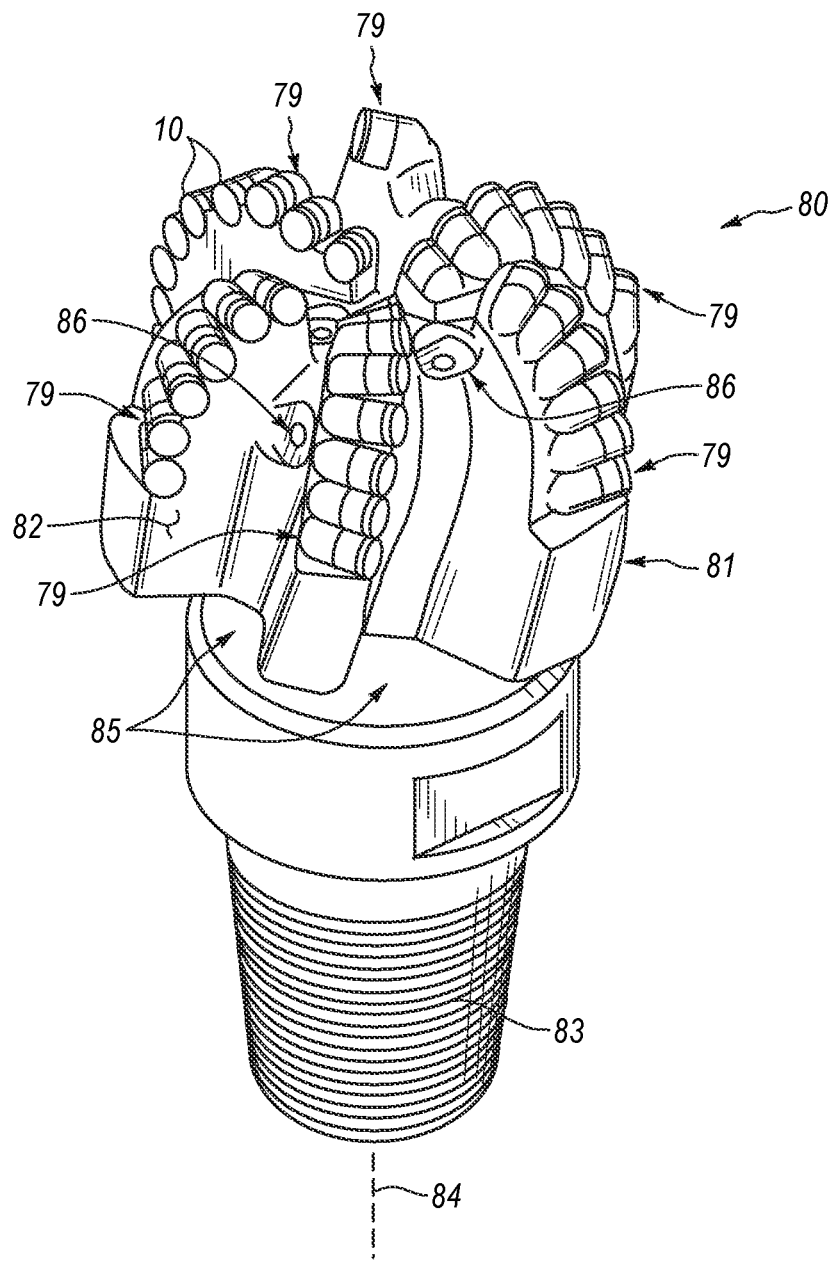
FIG. 9 is an isometric view of a drill bit according an embodiment, which includes one or more superabrasive cutting elements processed using any of the leaching mask assemblies disclosed herein.

FIG. 9 is an isometric view of a drill bit 80 according to an embodiment that may employ one or more superabrasive elements 10 processed using any of the leaching mask assemblies disclosed herein. Drill bit 80 may represent any type or form of earth-boring or drilling tool, including, for example, a rotary drill bit. As shown, drill bit 80 may include a bit body 81 having a longitudinal axis 84. Bit body 81 may define a leading end structure for drilling into a subterranean formation by rotating bit body 81 about longitudinal axis 84 and applying weight to bit body 81. Bit body 81 may include radially and longitudinally extending blades 79 with leading faces 82 and a threaded pin connection 83 for connecting bit body 81 to a drill string.

At least one superabrasive element 10 may be attached to bit body 81. For example, a plurality of superabrasive elements 10 may be attached to blades 79. Drill bit 80 may utilize any of the disclosed superabrasive elements 10 as cutting elements that have been leached using any of the protective leaching mask assemblies or methods disclosed herein. Circumferentially adjacent blades 79 may define so-called junk slots 85 therebetween. Junk slots 85 may be configured to channel debris, such as rock or formation cuttings, away from superabrasive elements 10 during drilling. Drill bit 80 may also include a plurality of nozzle cavities 86 for communicating drilling fluid from the interior of drill bit 80 to superabrasive elements 10.

Drill bit 80 may additionally represent any number of earth-boring tools or drilling tools, including, for example, core bits, roller-cone bits, fixed-cutter bits, eccentric bits, bicenter bits, reamers, reamer wings, and/or any other down-receptacle tools comprising superabrasive cutting elements and/or discs, without limitation. Superabrasive elements 10 disclosed herein may also be utilized in applications other than cutting technology. For example, embodiments of superabrasive elements 10 disclosed herein may also form all or part of heat sinks, wire dies, bearing elements, cutting elements, cutting inserts (e.g., on a roller cone type drill bit), machining inserts, or any other article of manufacture, as known in the art. According to some examples, superabrasive elements 10, as disclosed herein, may be employed in medical device applications, including, without limitation, hip joints, back joints, or any other suitable medical joints. Thus, superabrasive elements 10, as disclosed herein, may be employed in any suitable article of manufacture. Other examples of articles of manufacture that may incorporate superabrasive elements as disclosed herein may be found in U.S. Pat. Nos. 4,811,801; 4,268,276; 4,468,138; 4,738,322; 4,913,247; 5,016,718; 5,092,687; 5,120,327; 5,135,061; 5,154,245; 5,460,233; 5,544,713; and 6,793,681, the disclosure of each of which is incorporated herein, in its entirety, by this reference.

In additional embodiments, a rotor and a stator, such as a rotor and a stator used in a thrust-bearing apparatus, may each include at least one superabrasive element according to the methods or embodiments disclosed herein. By way of example, U.S. Pat. Nos. 4,410,054; 4,560,014; 5,364,192; 5,368,398; and 5,480,233, the disclosure of each of which is incorporated herein, in its entirety, by this reference, disclose subterranean drilling systems that include bearing apparatuses utilizing superabrasive elements 10 as disclosed herein.

Figure 10:
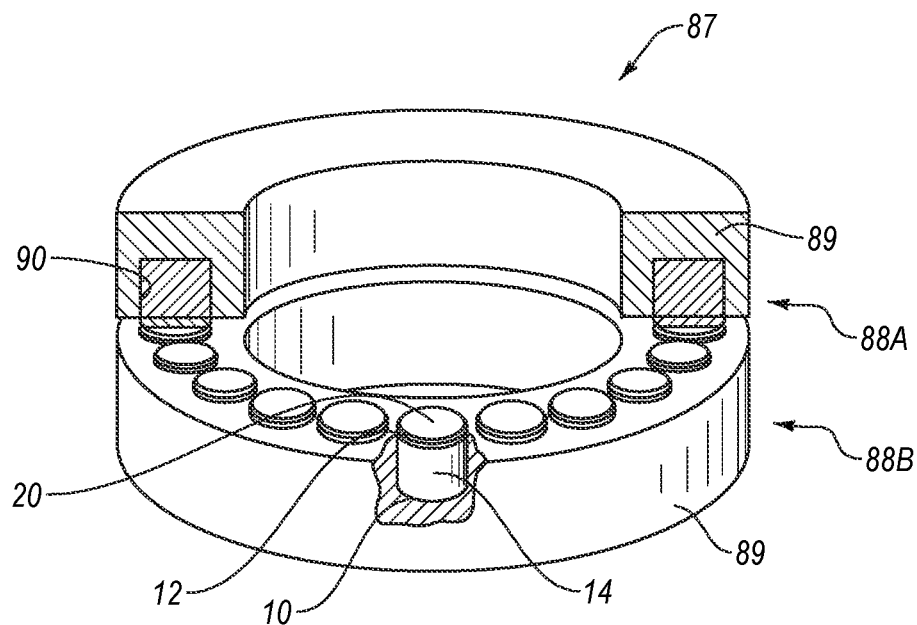
FIG. 10 is a partial cutaway isometric view of a thrust-bearing apparatus according to an embodiment, which includes one or more bearing elements processed using any of the leaching mask assemblies disclosed herein.

FIG. 10 is partial cross-sectional isometric view of a thrust-bearing apparatus 87 according to an embodiment. Thrust-bearing apparatus 87 may utilize any of the disclosed superabrasive elements 10 as bearing elements, which may have been leached using any of the protective leaching mask assemblies disclosed herein. Thrust-bearing apparatus 87 may also include bearing assemblies 88A and 88B. Each of bearing assemblies 88A and 88B may include a support ring 89 fabricated from a material, such as steel, stainless steel, or any other suitable material, without limitation.

Each support ring 89 may include a plurality of recesses 90 configured to receive corresponding superabrasive elements 10. Each superabrasive element 10 may be mounted to a corresponding support ring 89 within a corresponding recess 90 by brazing, welding, press-fitting, using fasteners, or any another suitable mounting technique, without limitation. In an embodiment, one or more of superabrasive elements 10 may be configured according to any of the superabrasive element embodiments or manufactured according to the methods described herein. For example, each superabrasive element 10 may include a substrate 14 and a superabrasive table 12 comprising a PCD material. Each superabrasive table 12 may form a superabrasive face 20 that is utilized as a bearing surface.

Superabrasive faces 20 of bearing assembly 88A may bear against opposing superabrasive faces 20 of bearing assembly 88B in thrust-bearing apparatus 87. For example, bearing assembly 88A of thrust-bearing apparatus 87 may be termed a "rotor." The rotor may be operably coupled to a rotational shaft. Bearing assembly 88B of thrust-bearing apparatus 87 may be held substantially stationary relative to the bearing assembly 88A and may be termed a "stator."

Figure 11:
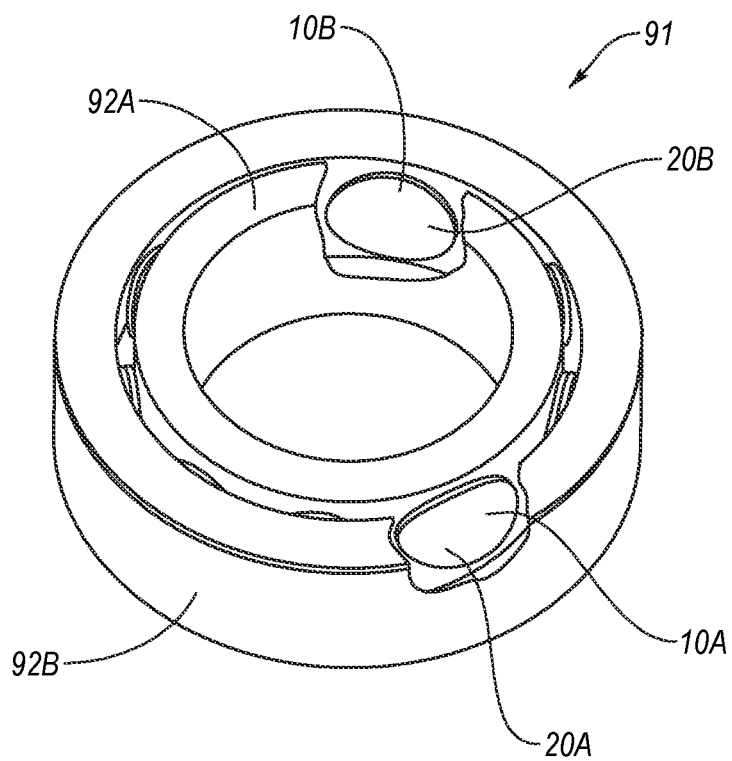
FIG. 11 is a partial cutaway isometric view of a radial bearing apparatus according to an embodiment, which includes one or more bearing elements processed using any of the leaching mask assemblies disclosed herein.

FIG. 11 is an isometric view of a radial bearing apparatus 91 according to another embodiment. Radial bearing apparatus 91 may utilize any of the disclosed superabrasive element embodiments as bearing elements 10A and 10B. Radial bearing apparatus 91 may include an inner race 92A positioned generally within an outer race 92B. Inner race 92A may include a plurality of bearing elements 10A affixed thereto, and outer race 92B may include a plurality of corresponding bearing elements 10B affixed thereto. One or more of bearing elements 10A and 10B may be configured in accordance with any of the superabrasive element embodiments disclosed herein that may have been leached using any of the protective leaching cups disclosed herein.

Inner race 92A may be positioned generally within outer race 92B. Thus, inner race 92A and outer race 92B may be configured such that bearing surface 20A defined by bearing elements 10A and bearing surface 20B defined by bearing elements 10B may at least partially contact one another and move relative to one another as inner race 92A and outer race 92B rotate relative to each other. According to various embodiments, thrust-bearing apparatus 87 and/or radial bearing apparatus 91 may be incorporated into a subterranean drilling system.

While various aspects and embodiments have been disclosed herein, other aspects and embodiments are contemplated. The various aspects and embodiments disclosed herein are for purposes of illustration and are not intended to be limiting. Additionally, the words "including," "having," and variants thereof (e.g., "includes" and "has") as used herein, including the claims, shall be open ended and have the same meaning as the word "comprising" and variants thereof (e.g., "comprise" and "comprises").

What is claimed is:

1. A method of processing a superabrasive element, the method comprising:
   forming a protective mask to protect a selected portion of a superabrasive element, the superabrasive element comprising a superabrasive table;
   exposing at least a portion of the superabrasive element to a leaching agent such that the leaching agent contacts an exposed surface region of the superabrasive table and at least a portion of the protective mask; and
   interference fitting a binding member with an outer side surface of the protective mask near the superabrasive table.

2. The method of claim 1, wherein forming the protective mask to protect the selected portion of the superabrasive element includes bonding the protective mask to the selected portion of the superabrasive element.

3. The method of claim 2, wherein the bonding includes at least one of mechanical bonding or chemical bonding the selected portion with the protective mask.

4. The method of claim 2, wherein bonding the protective mask to the selected portion includes bonding the protective mask to one or more grooves formed in the selected portion of the superabrasive element, the one or more grooves forming one or more interlocks between the protective mask and the selected portion of the superabrasive element.

5. The method of claim 1, wherein the binding member includes a ring-shaped member.

6. The method of claim 1, further comprising:
   removing the superabrasive element and the protective mask from the leaching agent; and
   removing the protective mask from the superabrasive element.

7. The method of claim 6, wherein removing the protective mask from the superabrasive element includes chemically removing the protective mask from the superabrasive element.

8. The method of claim 1, wherein the selected portion includes at least a portion of a side surface of the superabrasive table.

9. The method of claim 1, wherein the superabrasive element includes a substrate bonded to the superabrasive element, and wherein the selected portion includes at least a portion of a side surface of the substrate.

10. The method of claim 1, further comprising forming the protective mask to have a generally constant diameter at an intended interface between the protective mask and the binding member.

11. The method of claim 10, further comprising positioning the binding member at the intended interface between the protective mask and the binding member while spacing the binding member from a base portion of the protective mask.

12. The method of claim 1, further comprising compressing the protective mask onto the superabrasive element with the binding member.

13. The method of claim 1, wherein forming the protective mask to protect the selected portion of the superabrasive element comprises overmolding the protective mask onto the selected portion of the superabrasive element.

14. A method of processing a superabrasive element, the method comprising:
   forming a protective mask to protect a portion of a superabrasive element, the superabrasive element comprising a superabrasive table, the protective mask having an outer surface sloping at an oblique angle relative to a central axis of the superabrasive element and being non-parallel to an interface between the protective mask and the portion of the superabrasive element;
   exposing at least a portion of the superabrasive element to a leaching agent; and
   contacting the leaching agent with an exposed surface region of the superabrasive table and at least a portion of the protective mask.

15. The method of claim 14, further comprising fitting a binding member with a side surface of the protective mask proximate a superabrasive table of the superabrasive element.

16. The method of claim 15, further comprising forming the protective mask to have a generally constant diameter at an intended interface between the protective mask and the binding member.

17. The method of claim 14, further comprising defining the protective mask to have a first thickness proximate the exposed surface region of the superabrasive table that is greater than a second thickness of the protective mask that is positioned proximate a base portion of the superabrasive element.

18. The method of claim 14, further comprising defining the protective mask to have a first thickness proximate the exposed surface region of the superabrasive table that is less than a second thickness of the protective mask that is positioned proximate a base portion of the superabrasive element.

19. The method of claim 14, wherein forming the protective mask to protect the portion of the superabrasive element comprises overmolding the protective mask onto the portion of the superabrasive element.

20. A method of processing a superabrasive element, the method comprising:
   forming a protective mask to protect a portion of a superabrasive element, the superabrasive element comprising a superabrasive table;
   positioning a binding member over a portion of a side surface of the protective mask proximate a superabrasive table of the superabrasive element;
   exposing at least a portion of the superabrasive element to a leaching agent; and
   contacting the leaching agent with an exposed surface region of the superabrasive table and at least a portion of the protective mask.

21. The method of claim 20, further comprising selecting a material of the binding member to be chemically resistant to hydrofluoric acid.

22. The method of claim 20, further comprising compressing the protective mask onto the superabrasive element with the binding member.

* * * * *